(12) United States Patent
Sinclair et al.

(10) Patent No.: US 6,725,321 B1
(45) Date of Patent: Apr. 20, 2004

(54) MEMORY SYSTEM

(75) Inventors: Alan Welsh Sinclair, Edinburgh (GB); Natalia Victorovna Ouspenskaia, Edinburgh (GB); Richard Michael Taylor, Edinburgh (GB); Sergey Anatolievich Gorobets, Edinburgh (GB)

(73) Assignee: Lexar Media, Inc., Fremont, CA (US)

( * ) Notice: Subject to any disclaimer, the term of this patent is extended or adjusted under 35 U.S.C. 154(b) by 0 days.

(21) Appl. No.: 09/786,418

(22) PCT Filed: Feb. 17, 2000

(86) PCT No.: PCT/GB00/00550

§ 371 (c)(1),
(2), (4) Date: Mar. 5, 2001

(87) PCT Pub. No.: WO00/49488

PCT Pub. Date: Aug. 24, 2000

(30) Foreign Application Priority Data

Feb. 17, 1999 (GB) ................................. 9903490

(51) Int. Cl.[7] ............................................. G06F 12/00
(52) U.S. Cl. ................... 711/103; 365/185.29
(58) Field of Search ................. 711/104, 103, 711/168, 156, 115; 365/185.09, 185.11, 185.29, 185.33; 714/8

(56) References Cited

U.S. PATENT DOCUMENTS

| | | | | |
|---|---|---|---|---|
| 5,602,987 A | * | 2/1997 | Harari et al. ................... | 714/8 |
| 5,630,093 A | * | 5/1997 | Holzhammer et al. ...... | 711/115 |
| 5,740,396 A | * | 4/1998 | Mason ........................ | 711/103 |
| 5,838,614 A | * | 11/1998 | Estakhri et al. ........ | 365/185.11 |
| 5,896,393 A | * | 4/1999 | Yard et al. ............. | 365/185.09 |
| 5,905,993 A | * | 5/1999 | Shinohara .................... | 711/103 |
| 5,907,856 A | | 5/1999 | Estakhri et al. ............. | 711/103 |
| 5,987,573 A | * | 11/1999 | Hiraka ........................ | 711/156 |
| 6,069,827 A | * | 5/2000 | Sinclair ................. | 365/185.29 |
| 6,081,878 A | | 6/2000 | Estakhri et al. ............. | 711/168 |

* cited by examiner

*Primary Examiner*—Masser G. Moazzami
(74) *Attorney, Agent, or Firm*—Law Offices of Imam

(57) ABSTRACT

A memory system (10) having a solid state memory (6) comprising non-volatile individually addressable memory sectors (1) arranged in erasable blocks, and a controller (8) for writing to reading from the sectors, and for sorting the blocks into "erased" and "not erased" blocks. The controller performs logical to physical address translation, and includes a Write Pointer (WP) for pointing to the physical sector address to which data is to be written from a host processor. A Sector Allocation Table (SAT) of logical adrresses with respective physical addresses is stored in the memory, and the controller updates the SAT less frequently than sectors are written to with data from the host processor. The memory may be in a single chip, or in a plurality of chips. A novel system for arranging data in the individual sectors (1) is also claimed.

13 Claims, 21 Drawing Sheets

Fig.5.

| Chip Number | Block Number | Sector Number |
|---|---|---|
| 5 bits | 13 bits | 6 bits |

Fig.6.

| Header | Information | ECC |
|---|---|---|
| 1 byte | 43 bytes | 12 bytes |
| 24 | 26 | 28 |

Fig.7.

| No | RP | WP | SWP | Reserved | $SAT_N$ | $ASB_N$ | ... | $SAT_{N+7}$ | $ASB_{N+7}$ |
|---|---|---|---|---|---|---|---|---|---|
| 1 byte | 1 byte | 1 byte | 1 byte | 3 bytes | 18 bits | 18 bits | ... | 18 bits | 18 bits |

Fig.8.

| Range | ObsC | ObsP | Link | EB | BitMap |
|---|---|---|---|---|---|

Fig. 9.

| SAT Block Index | SAT Block Address | ASB Address | LWP | NVP | ASB Page 0 | ... | ASB Page N |
|---|---|---|---|---|---|---|---|
| 2 bytes | 3 bytes | 3 bytes | 1 byte | 1 byte | 1 byte | ... | 1 byte |

Fig. 10.

| Block Number | Obsolete or Deleted Sector Mask |
|---|---|
| 4 bytes | 32 bytes |

Fig. 11.

| Chip 0 Block 0 | Chip 1 Block 0 | Chip 2 Block 0 | Chip 3 Block 0 |
|---|---|---|---|
| 0 | 1 | 2 | 3 |
| 4 | 5 | 6 | Etc. |

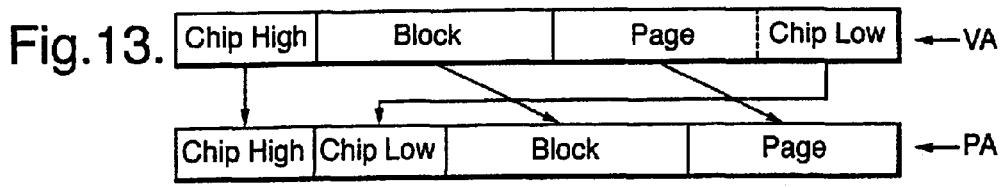
Fig. 12.
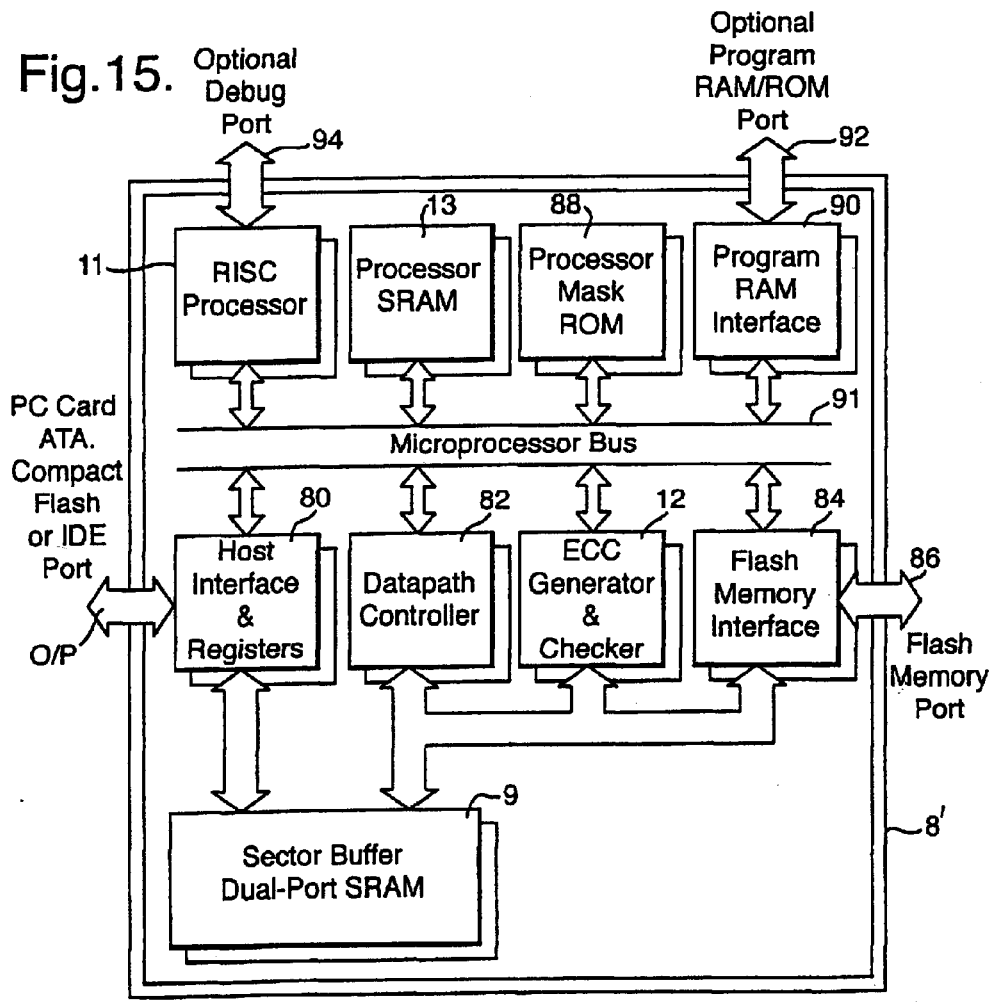
Fig. 13.
Fig. 15.

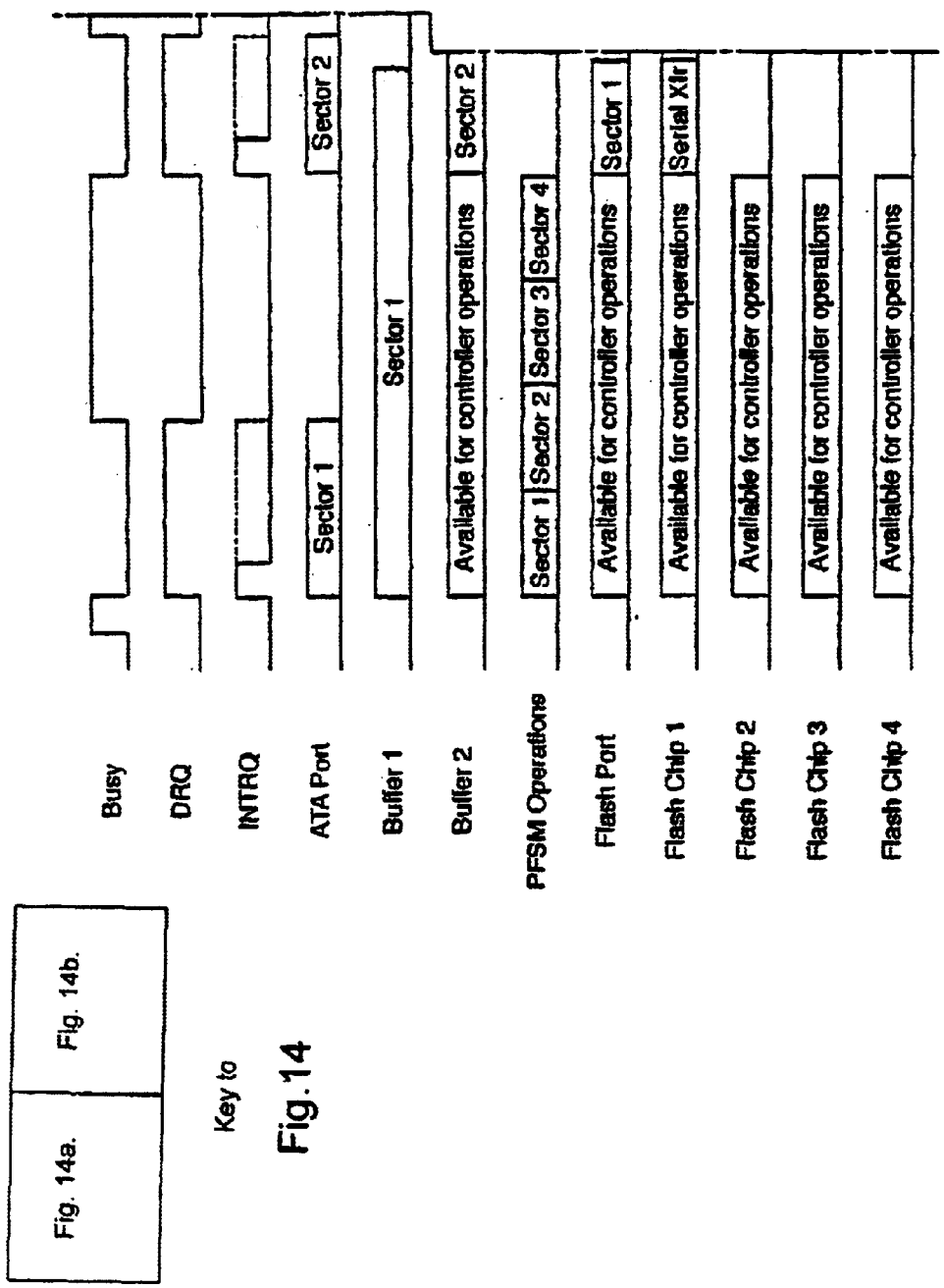

Fig. 16.

Capacity Allocation Table

|  | 8MB Card | | 64MB Card | | 512MB Card | |
| --- | --- | --- | --- | --- | --- | --- |
|  | Number of Blocks | % of Capacity | Number of Blocks | % of Capacity | Number of Blocks | % of Capacity |
| Total Capacity | 1024 | 100% | 8192 | 100% | 65536 | 100% |
| Sectors | 1007 | 98.1% | 8132 | 99.2% | 65131 | 99.4% |
| Boot Block | 1 | 0.1% | 1 | 0.01% | 1 | 0.00% |
| Control Block | 3 | 0.3% | 4 | 0.05% | 4 | 0.00% |
| Sector Address Table | 6 | 0.6% | 48 | 0.6% | 384 | 0.6% |
| Additional SAT Blocks | 6 | 0.6% | 8 | 0.1% | 8 | 0.01% |
| Obsolete Sectors | 1 | 0.1% | 1 | 0.01% | 1 | 0.00% |
| Erased Buffer | 2 | 0.2% | 2 | 0.02% | 2 | 0.00% |
| Spare Blocks |  |  |  |  |  |  |

Data in Flash Page after completion of write operation

Data in Buffer Memory in controller after completion of read operation

Fig.32.

Seqence of commands to controller data transfer hardware

| Command Sequence | Command Parameters | | | Command Description | | |
|---|---|---|---|---|---|---|
| | Flash Start Address | Buffer Start Address | No. of Data Xfr Cycles | ECC Generator Mode | Flash Clock | Summary |
| Cmnd 1 | n/a | B | 516 | Generator on Output register disabled | off | Generate ECC for 512 bytes of User Data + Header |
| Cmnd 2 | 0 | B | Y | Generator off Output register disabled | on | Transfer User Data 1 + User Data 2 to Flash buffer |
| Cmnd 3 | continue | B + 512 | 4 | Generator off Output register disabled | on | Transfer Header to Flash buffer |
| Cmnd 4 | continue | n/a | 12 | Generator off Output register enabled | on | Transfer ECC to Flash buffer |
| Cmnd 5 | continue | B + Y | 512 - Y | Generator off Output register disabled | on | Transfer User Data 3 to Flash buffer  Write Flash buffer to Flash array |

Fig.34.

Seqence of commands to conrtoller data transfer hardware

| Command Sequence | Command Parameters | | | Command Description | | |
|---|---|---|---|---|---|---|
| | Flash Start Address | Buffer Start Address | No. of Data Xfr Cycles | ECC Generator Mode | Flash Clock | Summary |
| Cmnd 1 | 0 | B | X | Generator on Output register disabled | on | Read Flash page to Flash buffer<br>Transfer User Data 1 from Flash buffer |
| Cmnd 2 | continue | B + X | Y - X | Generator on Output register disabled | on | Transfer User Data 2 from Flash buffer |
| Cmnd 3 | continue | B + 512 | 16 | Generator off Output register disabled | on | Transfer Header + ECC from Flash buffer |
| Cmnd 4 | continue | B + Y | 512 - Y | Generator on Output register disabled | on | Tranfer User Data 3 to Flash buffer |
| Cmnd 5 | n/a | B + 512 | 16 | Generator on Output register disabled | off | Transfer Header + ECC from Buffer to ECC Generator |

MEMORY SYSTEM

The present invention relates to a solid state memory system for data storage and retrieval, and to a memory controller for controlling access to a non-volatile memory of a solid state memory system. In particular, the invention relates to FLASH memory systems and controllers for FLASH memories.

FLASH EEPROM (electrically erasable programmable read only memory) devices are commonly used in the electronics industry for non-volatile data storage. Various types of FLASH memory devices exist, including devices based on NAND type memory cells, AND type memory cells, or NOR type memory cells. Such devices may have different types of interfaces to the host processor system(s) for which they are designed to interface, for example they may use a serial access type interface (as commonly used in many NAND and AND type devices) or a random access type interface (as used in some NOR type devices). The present invention is intended to be applicable, in appropriate forms, to at least some and preferably all of these different types of memory devices.

It is known to use solid state memory systems to try to emulate magnetic disc storage devices in computer systems. It is an aim of the industry to try to increase the speed of operation of solid state memory systems so as to better emulate magnetic disc storage.

According to a first aspect of the present invention we provide a memory system for connection to a host processor, the system comprising:

a solid state memory having non-volatile memory sectors which are individually addressable and which are arranged in erasable blocks of sectors, each said sector having a physical address defining its physical position in the memory;

and a controller for writing data structures to and reading data structures from the memory, and for sorting the blocks of sectors into blocks which are treated as erased and blocks which are treated as not erased; wherein the controller includes:

means for translating logical addresses received from the host processor to physical addresses of said memory sectors in the memory;

a write pointer (hereinafter referred to as the Write Pointer (WP)) for pointing to the physical address of a sector to which data is to be written to from the host processor, said Write Pointer (WP) being controlled by the controller to move in a predetermined order through the physical addresses of the memory sectors of any block which is treated as erased and, when the block has been filled, to move to another of the erased blocks;

wherein the controller is configured so that, when a sector write command is received from the host processor, the controller translates a logical address received from the host processor to a physical address to which data is written by allocating for said logical address that physical address to which said Write Pointer (WP) is currently pointing; and wherein the controller is configured to compile a table of logical addresses with respective physical addresses which have been allocated therefor by the controller (this table being hereinafter referred to as the Sector Allocation Table or SAT), and wherein the controller updates the SAT less frequently than memory sectors are written to with data from the host processor.

By not updating the SAT every time data from the host processor is written to a sector in the memory, but instead updating the SAT on a less frequent basis, the present invention thus provides very high speed operation of solid state memory, for example FLASH memory, thereby enabling good emulation of magnetic disk memory.

The physical sector addresses in the SAT are preferably ordered by logical sector address, whereby the Nth SAT entry contains the physical address of a sector to which data having logical address N has been written. When a sector read command is received from the host processor, the controller may look up a logical sector address received from the host processor in the SAT in order to obtain the physical sector address which the controller previously allocated to said logical sector address. The SAT is preferably stored in one or more of said blocks of memory sectors in the solid state memory, each block which contains any portion of the SAT hereinafter being referred to as a SAT block. Preferably the SAT is updated by rewriting one or more blocks of the SAT. By updating a whole block of SAT sectors at a time this significantly speeds up operation of the memory system.

There may be provided at least one block of sectors (hereinafter referred to as the Additional SAT Block (ASB)), containing modified versions of individual sectors of a said SAT block. Each sector in a said ASB block preferably contains the physical address of the sector of the SAT block which it updates, and the modified version of the said SAT sector. The purpose of an ASB is to cache individually in solid state memory modified sectors of the SAT so as to reduce the number of SAT block rewrites. When all the sectors in a said ASB block are written to with modified versions of SAT sector(s), the respective SAT block is rewritten so as to include all the modified versions in the ASB block and the ASB block is erased.

It will be appreciated that in the memory system of the present invention the physical address which is allocated to any given logical address received from the host processor is not dependent on the logical address itself. The controller merely allocates the physical sector address to which the Write Pointer is currently pointing.

As described above, the controller fills one said block which is treated as erased before moving the Write Pointer (WP) on to another block. The controller may conveniently be configured to move the Write Pointer (WP) in a predetermined order through the blocks which are treated as erased.

The controller may conveniently control the Write Pointer (WP) so as to move sequentially, in ascending numerical order of physical address, through the erased blocks, as each block is filled with data written thereto. The control of the Write Pointer (WP) may be cyclic in the sense that once the sectors in the highest block, according to physical address order, have been filled with data the WP is controlled by the controller to wrap around to the block of sectors having the numerically lowest physical addresses out of all the blocks currently being treated by the controller as erased.

The controller may, alternatively, use another predetermined order for writing data to the memory sectors. For example, the controller may control the Write Pointer (WP) to move sequentially in descending numerical order, according to physical address, through the blocks which are treated as erased. Another possibility would be to move in non-sequential order through the physical sector addresses. For example, the WP may move in descending numerical address order through the physical sector addresses in each block which is treated as erased, and move from block to block in some predetermined order such as, for example, in ascending numerical order according to the physical address of the first sector in each said block.

It will be appreciated that many other predetermined orders are possible for writing data to the sectors in the blocks which are treated as erased. Furthermore, the controller could use the erased blocks in any other order which need not be predetermined, or which may be only partially predetermined. Although generally not preferred, the erased blocks could even be used in a random order.

The memory sectors in each said block of sectors are preferably erasable together as a unit. The sectors may also be individually erasable (for example where the solid state memory is AND type memory). The controller is preferably configured to control erase operations on the memory so as to only erase whole blocks of memory sectors. A block of sectors will be treated by the controller as an erased block if all the memory sectors therein are erased. If a block go contains one or more bad (i.e. defective) sectors, the controller may define the whole block as being bad and treat that block as a not erased block, whereby no data will be written thereto. Alternatively, if a block contains one or more bad sectors the controller may treat that block as an erased block whereby the controller may still use good sectors in the block to store data. In the latter case, though, the memory system preferably includes a table identifying bad sectors and the controller is configured to check whether the next sector address to which the Write Pointer (WP) is to be moved is the address of a bad sector and, if it is the address of a bad sector, to control the Write Pointer to skip this bad sector and move to the next sector address according to the predetermined order in which the sectors are to be written to.

For the avoidance of doubt, any block which contains any good (i.e. not defective) sectors which have already been written to will be treated by the controller as a not erased block. Furthermore, it is intended that the term "erased" sector covers not only a sector which has been erased, but also covers a sector which has never yet been written to, and so has not yet ever been erased. Thus, a block of sectors which have never yet been written to is treated by the controller as an erased block.

Each block of sectors preferably has a physical block address defining its physical position in the memory. The physical address of each said memory sector will preferably include the physical block address of the block in which it is located. The controller may advantageously be configured to compile a list of the physical block addresses of at least some of the blocks of sectors being treated as erased, which may be used by the controller in order to quickly identify the next block of sectors to be written to. This list of addresses of erased blocks is preferably stored by the controller in a temporary memory which may be provided in the memory system, which temporary memory may conveniently be an SRAM in a microprocessor of the controller, and may be created from information already stored in the solid state memory by the controller identifying the erased state of each block of sectors. (This information will preferably be held in the form of a bitmap in the solid state memory, in which each block is recorded as an erased block or a not erased block.)

The controller is conveniently configured so that, when a sector write command is received by the controller from the host processor which command renders obsolete data previously written to another sector, the controller stores in a temporary memory the address of the sector containing the now obsolete data. This temporary memory may conveniently be SRAM or DRAM provided in a microprocessor of the controller. If a sector delete command, generated by a user, is received from the host processor by the controller, the controller preferably marks as obsolete the sector to be deleted (without physically erasing the sector). The controller may allow only one block at any time, hereinafter referred to as the Current Obsolete Block (COB), to contain one or more sectors containing obsolete data which was written by the Write Pointer (WP), and when all the sectors in the COB contain obsolete data, the COB is immediately erased. This is a particularly suitable scheme for the case where the Write Pointer (WP) moves sequentially through the memory sector addresses in each block which is treated as erased before moving on to the next block. In such a scheme, a series of obsolete sectors to be deleted (which may, for example, contain part of a user data file which has been rewritten) will in most cases all be in the same block. When a series of sectors are rewritten in a different order to that in which they were previously written, this may create obsolete sectors in more than one block. Where a sector in a block other than the COB is to contain obsolete data, the controller preferably relocates any data in valid (not obsolete) sectors in the COB to another block, which may be the block to which the Write Pointer (WP) is currently pointing, and then erases the COB. Said sector in the block other than the COB is then marked as obsolete and this other block is now the COB. Rather than writing the relocated data to the current location of the write Pointer, the memory system may include a second write pointer, hereinafter referred to as the Relocation Pointer (RP), for pointing to the physical address of the sector to which such relocated data is to be written, the Relocation Pointer (RP) always being in a different block of sectors to the Write Pointer (WP). This has the advantage of preventing relocated data from being intermingled with data structures directly ordered to be written by the host processor i.e. written by the Write Pointer (WP).

Generally, only two types of data are written to the solid state memory from the host processor. These are file data and system data. To further reduce the number of reallocations and erasures, the memory system may further include a third write pointer, hereinafter referred to as the System Write Pointer (SWP), which points to the physical address of the sector to which system data is to be written from the host, the SWP always being in a different block to the Write Pointer (WP) (and in a different block to the Relocation Pointer, if there is one). System data will preferably be identified during initialisation of the system and will be updated as necessary during operation.

Where both a write pointer (WP) and a system write pointer (SWP) are provided, file data will in this case always be written to the addresses pointed to by the Write Pointer (WP). Both the Relocation Pointer (RP) and System Write Pointer (SWP) are preferably controlled to move through the physical addresses of the memory sectors in said blocks which are treated as erased in a similar manner to the Write Pointer (WP). Thus, when all the (good) sectors in a said block have been filled with relocated data or system data, the respective one of the Relocation Pointer (RP) and the System Write Pointer (SWP) moves on to the next address defined by the controller to be used from the physical addresses of all the sectors in the blocks treated as erased.

Where a System Write Pointer (SWP) is provided, the controller will preferably allow at least two blocks which contain one or more obsolete sectors to exist at any time, one being said COB and the other being a Current Obsolete System Block (COSB) containing one or more obsolete system data sectors. If any system data sectors need to be relocated in order to allow the COSB to be erased, the relocated system data is preferably sent to the address to which the System Write Pointer (SWP) is currently pointing.

In fact, there may temporarily exist more than two blocks (the COB and COSB) containing obsolete data at any one time. It is possible that when the COB, for example, needs to be erased (obsolete data has just been created in another block) one of the write pointers may be pointing thereto i.e. the WP is still writing to the block which is currently the COB. Where this is the case the controller preferably proceeds with creating the new COB but postpones the erasure of the old COB (which is hereinafter treated as the Pending Obsolete Block (POB)) until all erased sectors in the POB have been filled and the write pointer moves on to the next erased block to be used, as defined by the controller. At this time any valid (not obsolete) data in the POB is relocated and the POB is erased.

In addition to writing data structures to the memory from the host processor, the controller may also generate and write to the memory data designated as control information. The controller preferably writes such control information in separate ones of the blocks of memory sectors to those in which data structures received from the host processor are written. Blocks for storing such control information, hereinafter referred to as Control Blocks (CBs), will be updated periodically by the controller and will be accessed during initialisation, and occasionally during operation, of the memory system.

The controller preferably stores in a temporary memory (which may be a RAM provided in the memory system or which may conveniently be an embedded SRAM or DRAM in a microprocessor of the controller) a list of logical sector addresses for data structures which have been written by the Write Pointer (WP) since the SAT was last updated. This list stored in the SRAM is hereinafter referred to as the white sector list (WSL). The logical addresses in the WSL are advantageously stored in the order in which they were written to the non-volatile sectors in the memory. Conveniently, for a group of consecutively written sectors, the WSL entry may therefore be written as the first sector logical address and the sector group length i.e. the number of sectors written. Each said sector group is defined so as not to span more than one block of sectors.

The controller advantageously also stores in said temporary memory the order in which blocks have been used by the Write Pointer (WP) for writing data since the last update of the SAT. This is stored in the form of a list of block addresses of the blocks in which the updated sectors whose addresses are held in the WSL are located. This list of block addresses is hereinafter referred to as the Write Block List (WBL). It will be appreciated that since the memory system, by virtue of the WSL and WBL, contains knowledge of the location in physical memory which was allocated for the first logical address in said group of consecutively written sectors, the controller can thus always access the correct physical sector for each logical sector address in a said group of consecutively written sectors written since the last SAT update, using the WSL and WBL. The WSL will preferably have a predetermined size and once the WSL is full one or more SAT blocks (and/or ASBs) may be updated and the WSL and WBL are emptied.

Preferably, the starting physical sector address, and the links between blocks containing sectors to which data has been written by the controller since the last SAT update, are also stored in a Control Block of the solid state memory. By storing the logical sector address for the user data stored in each sector in the sector itself, for example in a header field provided in the sector, the WSL and WBL can therefore easily be recreated following any removal and restoration of power to the system by scanning through the solid state memory, reading the logical addresses in the sectors written to since the last update of the SAT, until reaching a block which is not full. This is the block which contained the Write Pointer (WP) before removal or loss of power. This provides high data security in the event of unexpected power removal from the memory system.

Where a Relocation Pointer and a System Write Pointer are included in the memory system, the controller preferably also stores in said temporary memory (e.g. SRAM or DRAM in the controller microprocessor) similar lists of logical sector addresses corresponding to sectors in the memory to which relocated data or system data has been written to respectively, which lists are hereinafter referred to as the Relocation Sector List (RSL) and Write System Sector List (WSSL) respectively. The controller may also store in said temporary memory corresponding lists of the order of blocks which have been used by the RP and the SWP, similar to the Write Block List, and these two lists will hereinafter be referred to as the Relocation Block List (RBL) and the Write System Block List (WSBL). Moreover, the starting physical sector address, and the links between blocks containing sectors to which relocated data or system data has been written since the last SAT update may also be stored in at least one said Control Block (CBs) of the solid state memory whereby the RSL and WSSL can be recreated following any removal and restoration of power to the host processor by simply scanning the memory and reading the logical addresses in the sectors written to by the RP and SWP respectively, since the last update of the SAT.

Each said sector in any of the above-described embodiments may consist of a single "pages" of memory i.e. one row of memory cells in a said block of memory sectors. However the invention is not limited exclusively to such a sector format and in some cases (for example when using random access NOR type memory) each said sector may be less than, or greater than, one page. Moreover, in the latter case not all said sectors need necessarily be of the same size. For example, a data organisation scheme such as that described in our earlier International Patent Application No. PCT/GB 99/00188 could be used by the controller to form sectors of appropriate sizes so as to avoid individual defects (of sub-sector size) which may be present in the solid state memory.

Each sector is, as aforesaid, individually addressable. Each sector may comprise a plurality of sector portions which are also each individually addressable and the controller may write to, and read from, each sector portion individually. It will be appreciated that the smallest possible sector portion size is the minimum addressable unit of the memory. In NOR type memory, for example, the minimum addressable unit of memory is commonly 1 byte.

The controller preferably writes data to, and reads data from, the memory sectors in uniformly sized data segments. Where all the memory sectors are the same size, each said data segment is preferably equal in size to the size of a said memory sector. Each data segment may comprise data structures from the host processor (e.g. file or system data) and/or data generated by the controller.

Where the solid state memory is based on NAND type devices, the controller preferably stores in said one or more Control Blocks a list of the block addresses of blocks in the non-volatile memory containing bad sectors (hereinafter referred to as the Bad Block List (BBL)), and the controller treats each such block as a "not erased" block, so that it will not appear in the list of erased blocks which may be stored in temporary memory, and the controller will not write any data to that block.

Where the memory is based on AND type devices, the controller preferably stores in said one or more Control Blocks (CBs) a list of addresses of any bad sectors, and the controller controls the said write pointer(s) to use the good sectors in any block containing at least one bad sector, and to skip any bad sectors. It will be appreciated that in the latter case where a block containing one or more bad sectors is to be erased the good (i.e. non-defective) sectors in the block are erased individually during a block erase operation.

The controller advantageously also stores in said one or more Control Blocks a list of the block addresses of all SAT blocks. This list is preferably in the form of a plurality of list portions, each said portion being hereinafter referred to as a Table Block List (TBL), and each said portion containing the block addresses of a group of logically contiguous SAT blocks and any corresponding ASBs.

The controller preferably stores the block addresses of said one or more Control Blocks in a dedicated block of the memory hereinafter referred to as the Boot Block (BB). Other important information required for data security may also be stored in the Boot Block, for example the list of bad blocks (or bad sectors). Preferably, the first block of sectors in the memory which does not contain any bad sectors is designated as the Boot Block (BB).

Preferably, the controller will only use blocks containing all good sectors as SAT blocks, Control Blocks, ASBs or BBs.

A cache may be provided in temporary memory (for example RAM in the memory system, such as SRAM or DRAM in the controller microprocessor), in which the controller stores a group of contiguous SAT entries including the SAT entry most recently accessed from the SAT (by the controller). This further improves address translation speed. Further increase in speed of address translation may be achieved by creating in said temporary memory a list of physical addresses of all ASBs and the SAT blocks with which they are associated (hereinafter referred to as the ASB List or ASBL) which is updated each time a SAT sector write operation is performed. Similarly, the positions of the TBLs in the Control Block(s) may also be stored in said temporary memory so as to allow even faster logical-to-physical sector address translation.

The solid state memory may comprise a single memory array in the form of a single memory chip, or may comprise a plurality of memory arrays in the form of a plurality of memory chips. Where the memory comprises a plurality of chips, the controller advantageously forms the memory sectors in the plurality of memory chips into a multiplicity of virtual blocks, each said virtual block comprising one erasable block of memory sectors from each said memory chip, and the controller preferably sorts said virtual blocks into ones which are treated as erased and ones which are treated as not erased. The controller preferably compiles a list of the virtual blocks treated as erased and stores this in temporary memory in the memory system, which may be SRAM in a microprocessor of the controller. The controller preferably controls the Write Pointer (WP) (and the RP and SWP, where provided) to move from one chip to another for each consecutive sector write operation, starting at one sector in one erasable block of the virtual block and moving consecutively to one sector in each of the other erasable blocks in the virtual block until one sector has been written in each erasable block of the virtual block, and then moving back to the chip in which the first sector was written and proceeding in a similar manner to fill another one sector in each erasable block of the virtual block, and so on until the virtual block is full of data. The Write Pointer (WP) then moves on to the next virtual block in said list of virtual blocks being treated as erased, and fills this next virtual block in a similar manner. The controller is preferably configured so that for every n contiguous sector write operations the controller executes, where n is less than or equal to the number of solid state memory chips in the memory system, the controller writes substantially concurrently to one sector in each of n of the chips. The controller preferably carries out erasure of any said virtual block by concurrently erasing all the erasable blocks in the virtual block.

It will be appreciated that the controller of the memory system may be substantially implemented in circuitry as a controller device, but will preferably be implemented, at least in part, as firmware held in the memory of a controller device. The controller may be integrally formed on the same chip (or one of the same chips) as the solid state memory.

According to a second aspect of the invention we provide a memory system for connection to a host processor, the memory system comprising:

a solid state memory comprising a plurality of solid state memory chips each having non-volatile memory sectors which are individually addressable and which are arranged in erasable blocks of sectors, each said sector having a physical address defining its physical position in the memory;

and a controller for writing data structures to and reading data structures from the memory, wherein:

the controller forms the erasable blocks into virtual blocks, each said virtual block comprising an erasable block from each of the memory chips, and the controller sorts the virtual blocks into ones which are treated as erased and ones which are treated as not erased, and the controller fills one virtual block with data prior to moving on to the next virtual block to be filled, and each virtual block is filled by writing to the memory sectors thereof in a repeating sequence in which the controller writes to one memory sector in each of the erasable blocks of the virtual block one after another whereby consecutively written sectors are in different chips.

Preferably, the controller is configured so that for every n contiguous sector write operations the controller executes for a multiple sector write command received from the host processor, where n is less than or equal to the number of solid state memory chips in the memory system, the controller writes substantially concurrently to one sector in each of the n of the chips.

According to a third aspect of the invention we provide a controller for writing data structures to and reading data structures from a solid state memory having non-volatile memory sectors which are individually addressable and which are arranged in erasable blocks of sectors, each said sector having a physical address defining its physical position in the memory, wherein the controller includes:

means for translating logical addresses received from a host processor of a memory system in which the controller is used to physical addresses of said memory sectors in the memory, and for sorting the blocks of sectors into blocks which are treated as erased and blocks which are treated as not erased;

and a Write Pointer (WP) for pointing to the physical address of a sector to which is to be written to from the host processor, said Write Pointer (WP) being controlled by the controller to move in a predetermined order through the physical addresses of the memory sectors in any block which is treated as erased and, when the block has been filled, to move to another of the erased blocks;

and wherein, when a sector write command is received by the controller from the host processor, the controller translates a logical sector address received from the host processor to a physical address to which data is written by allocating for said logical address that physical address to which said Write Pointer (WP) is currently pointing;

and wherein the controller is configured to compile a table (the SAT) of logical addresses with respective physical addresses which have been allocated therefor by the controller, and to update the SAT less frequently than memory sectors are written to with data from the host processor.

According to a fourth aspect of the invention we provide a method of controlling reading and writing of data structures to and from a solid state memory having non-volatile memory sectors which are individually addressable and which are arranged in erasable blocks of sectors, each said sector having a physical address defining its physical position in the memory, the method comprising the steps of:

sorting the blocks of sectors into blocks which are treated as erased and blocks which are treated as not erased; providing a Write Pointer (WP) for pointing to the physical address of a sector which is to be written to, and controlling said at least one Write Pointer (WP) so as to move in a predetermined order through the physical addresses of the memory sectors of any block which is treated as erased and, when the block has been filled, to move to another of the erased blocks; and, when a sector write command is received from the host processor, translating a logical address received from the host processor to a physical address to which data is written by allocating for said logical address that physical address to which said Write Pointer (WP) is currently pointing;

storing in non-volatile solid state memory a table (the SAT) of logical addresses with respective physical addresses which have been allocated therefor by the controller;

and updating the SAT less frequently than memory sectors are written to with data from the host processor.

Preferred embodiments of the invention will now be described by way of example only and with reference to the accompanying drawings in which:

FIG. 5 illustrates the format of a physical address (PA) of a page;

FIG. 6 illustrates a Control Block (CB) entry;

FIG. 7 illustrates one entry in a Table Block List (TBL);

FIG. 8 shows the format of a MAP entry;

FIG. 9 shows the format of an entry in the ASB List (ASBL);

FIG. 10 illustrates the format of a Current Obsolete Block (COB) Structure;

FIG. 11 is a table illustrating the order in which sectors are written to in a virtual block of a multiple FLASH chip memory system according to one embodiment of the invention;

FIG. 12 shows the format of a Virtual Address (VA);

FIG. 13 shows how the PA is obtained from the VA;

FIG. 15 is a block diagram of a controller chip;

FIG. 16 is a table showing allocated memory capacity for a memory system of the invention;

FIG. 32 is a table of controller commands used to transfer the data from the controller buffer to the FLASH memory during the write operation of FIGS. 31(a) and (b);

FIG. 34 is a table of of controller commands used to transfer the data from the FLASH memory to the controller buffer during the read operation of FIG. 33.

Figure 1:
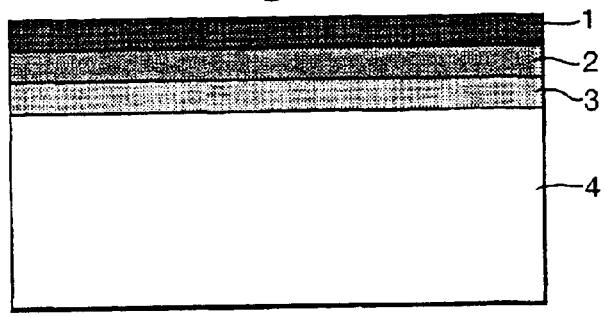
FIG. 1 is a schematic illustration of one block of sectors in a NAND type FLASH memory, showing three sectors therein.

FIG. 1 illustrates schematically the physical page structure in one block 4 of a FLASH memory array based on NAND type memory cells. FIG. 1 shows three pages 1, 2, 3 in the block 4. The page 1 in physical terms comprises one row of memory cells in a block of memory, the memory being partitioned into many such blocks each comprising a multiplicity of rows of memory cells (i.e. a multiplicity of pages). Each page 1, 2, 3 is treated as one sector of physical memory space in the FLASH memory system which will be described and is 528 Bytes wide. Each page 1 in the memory is individually addressable (for read/write and delete operations), and the pages are erasable in blocks. We will now describe a memory system incorporating such a memory array. We will later additionally describe memory systems based on AND or NOR type FLASH memory.

Figure 2:
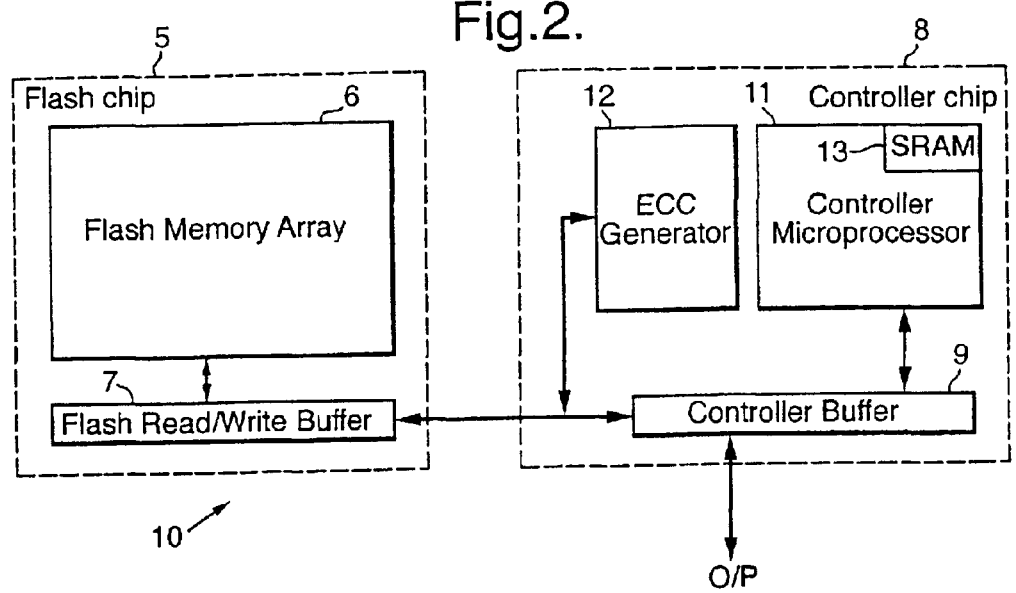
FIG. 2 is a block diagram of a memory system comprising a FLASH chip and a controller chip.

FIG. 2 shows a memory system 10 incorporating a FLASH memory chip 5 and a controller chip 8. The FLASH memory chip 5 comprises a FLASH memory array 6 and a read/write buffer 7 interfaced to a controller buffer 9 in the controller chip 8. The controller chip 8 further includes a controller microprocessor 11 and an Error Correction Code (ECC) generator and checker 12. The controller buffer 9 interfaces to a host computer processor (not shown) connected to the memory system 10 via an output O/P of the controller chip 8. The controller chip 8 (hereinafter referred to as the "controller"), controls the reading and writing of data structures to and from the memory array 6. The host processor 2 connected to the memory system 10 sends read and write commands to the controller 8. Data can be accessed by the host in 512 Byte portions or "host data sectors", each of which has a logical sector address (LA). The controller 8 receives an LA from the host processor and translates this to a physical address as will be described hereinbelow. In the present case (NAND type memory), each physical address (PA) defines the physical position of a page 1 of the FLASH memory in the array 6. Each LA is in the form of one 24 bit field. Accessing a PA using an LA is referred to as address translation and is commonly the most frequent operation needed on every read/write access. The controller 8 writes data to the memory array 6 in data segments, each segment being 528 Bytes wide. For each 512 Bytes of data received from the host (e.g. user file or system data) the controller generates 16 Bytes of data comprising a 4 Byte Header generated by the microprocessor 11 and a 12 Byte ECC produced by the ECC generator and checker 12. The controller organises this into a 528 Byte data segment which is written to one page of the memory array 6, via the FLASH buffer 7. The logical address (LA) of a host data sector is stored in the 4 Byte Header in the FLASH Sector 1 in which that host data sector is written. On a read operation the data stored in the relevant sector of the FLASH memory array is read from array 6, via the FLASH read/write buffer 7, into the controller buffer 9 (and concurrently to the ECC generator and checker to check for errors in the data), and the controller reads the 4-byte header to check that the stored LA matches the LA requested by the host computer, prior to allowing the host computer to read the data from the controller buffer 9.

The Controller 8 manages the physical location of data written to the memory 6 on an individual sector basis. As will be later described in further detail, the controller stores in the memory 6 a BitMap (MAP) of erased blocks and compiles in SRAM in the microprocessor 11 a list (the Next Erased Block (NEB) list) of at least some erased blocks, ordered in ascending order of block physical addresses, which erased blocks are to be used for writing to. The physical page location at which a host data sector is written does not depend on the logical address received from the host. Each Host Data sector is written at an address defined by a cyclic write pointer. Special write pointers are used for different types of write operations; host file data writes are performed at an address pointed to by the Data Write Pointer (WP), host system data writes at an address pointed to by the System Write Pointer (SWP). The Relocation Pointer (RP) is used for writing sectors which were not directly ordered by a host. Each of these write pointers has an identical behaviour: each pointer moves sequentially through the pages of a block, then moves to the first page of the next erased block in the Next Erased Block (NEB) list. Blocks containing files which are not erased are treated as "not erased" blocks and are skipped when a pointer moves from one block to another (and are never included in the NEB)

Sector Relocation Algorithm

When a block 4 of sectors is to be erased, so as to recover sector space containing obsolete data, sectors must be relocated from a block containing a combination of valid and obsolete sectors to allow the block to be erased. In principle, the controller 8 allows only one block corresponding to a specific write pointer to contain obsolete data sectors at any time. When a sector to be written by the host would produce an obsolete sector in a second block, the existing block must first be erased, after relocation of valid sectors, if necessary.

Therefore, numerous erasures and extensive relocations of sectors are unavoidable when a majority of blocks are to contain both valid and obsolete sectors. This occurs only when a sequence of sectors written by a host as a part of a file differs from the sequence in which they had previously been written. This is not the normal case in most applications. However, even in case of normal file write operation, relocation of non-related data must be performed from blocks containing a head, and tail, of a file. There is a high probability that relocation of system data intermingled with "other file" data will cause additional erasure of another block and this will produce more relocations from this block.

To reduce the total number of relocations and erasures system data is therefore specifically identified and is always written or relocated at the address of the System Write Pointer (SWP). Information about system data is obtained during initialisation process and is stored in the microprocessor SRAM 13. It will be generally understood that a data file is written to the FLASH memory by a file system in the host computer processor. File data is partitioned into clusters by the file system, where each cluster is a group of contiguous host data sectors of (typically) 512 Bytes. The file system maintains tables and data structures relating to the attributes of the files stored in the memory and the locations of the clusters which form each file. These tables and structures are stored in the FLASH memory (as system data) and are updated by the file system whenever file data is written. When file data is written to the memory it is accompanied by system data (e.g. for Directory and File Allocation Tables) which relate to the file. System data written in the memory commonly includes BIOS Parameter configuration information, one or two copies of the File Allocation Table (FAT) in which each entry relates to a specific cluster, the Root Directory, and Subdirectory information. The controller is configured to recognise an operation to write a host system data sector, thereby enabling it to treat this host data sector differently to a host data sector of file data. A number of methods may be used either singly or together to recognise system sector writes, as follows:

1. System data is written with single sector write commands, whilst file data may be written with multiple sector write commands.

2. All sectors with LAs below the last sector address in the file system Root Directory are system sectors. This address can be determined from information held in a BIOS parameter block stored in the memory by the host file system.

3. All sectors within Subdirectories are system sectors. Subdirectory addresses and sizes can be identified by reading all Root Directory and Subdirectory entries.

4. System sectors are often read by a file system immediately before they are rewritten.

For the same purpose file data sectors to be relocated are written at the address defined by a Relocation Pointer (RP), and are therefore not intermingled with sectors written by the host.

In a modified embodiment of the invention, an additional write pointer may be provided to point to the location to which relocated system data is to be written. This additional pointer is referred to as the System Relocation Pointer (SRP), and is always located in a different block to the WP and SP.

Block Erase Algorithm

No arbitrary selection of a block to be erased or scheduling of background erasure is carried out in the present invention. Listed erasure of a block containing obsolete sectors is normally immediately performed when an obsolete sector in a second block will result from a host sector write command which is pending. Similarly, a block is immediately erased when it contains totally obsolete control data structures as a result of the rewriting of a control block. (Control blocks are where the controller 8 writes certain control data, and are described in further detail later).

Therefore, normally, since relocations cannot produce obsolete data, there can exist not more than two blocks which contain obsolete data; the Current Obsolete Block (COB) corresponding to the Data Write Pointer (WP) and containing obsolete file data and the Current Obsolete System Block (COSB) corresponding to the System write Pointer (SWP) and containing obsolete system data. However, temporarily there may exist one more obsolete block of each type. This will occur when a block to be erased (obsolete data has just been created in another block) at this moment also contains a write pointer of any type. In this case erasure of such a block (designated Pending Obsolete Block (POB)) has to be postponed until all erased pages in this block have been used and the relevant write pointer will be moved to another block. At this moment the Pending Obsolete Block is immediately erased.

As aforementioned, erased block identity is maintained in a BitMap (MAP) spanning the whole FLASH block address space, in which MAP the erased state of each block is recorded. Erased blocks are consumed for sector or control data writing sequentially in block address order. No background erasure is carried out. Any block containing one or more bad sectors is treated as a Bad Block and is treated as a snot "erased" block by the controller.

Wear Levelling

The use of cyclic write pointers and single sector write management produces inherent wear levelling in the FLASH memory. However, the algorithm of erasing blocks as soon as they are populated with obsolete or deleted data produces a wear levelling characteristic which is a function of the sequences of sector write operations. If any further wear levelling is thought to be necessary, then separate additional techniques may be incorporated, such as occasional relocation of sectors in random blocks so as to allow these blocks to be erased.

Address Translation Principles

The principal address translation means is the Sector Address Table (SAT), which basically is a list of physical addresses of sectors, ordered by logical address. Thus the Nth SAT entry normally contains the physical address for sector with logical address N. The SAT is organised as a number of independent blocks (SAT blocks), and is updated by rewriting individual pages of the SAT blocks. A SAT block may have a dedicated Additional SAT Block (ASB) linked with it to allow modification of individual pages of the SAT Block. SAT pages are not rewritten after each sector write, but on a much less frequent basis, to minimise impact on sector write performance.

Therefore, the SAT will not contain the correct physical address for sectors written since the SAT was last updated. The logical addresses of such sectors are stored by the processor in its SRAM 13 in lists called the Write Sector List (WSL), Relocation Sector List (RSL) and Write System Sector List (WSSL). These lists exactly match the ordering of the sectors themselves which were written by a host or relocated from blocks before erasure. In the case of consecutively written sectors the WSL and RSL entry defines first sector logical address and the sector group length. The sector groups cannot jump from one block to another. The microprocessor 11 has knowledge of the starting point of the sector series in Flash memory, and also the order in which blocks were used for sector writing (special lists, complimentary to those described above and created in the processor SRAM, namely the Write Block List (WBL), Write System Block List (WSBL) and Relocation Block List (RBL), are used to store this information and are described in further detail later), and so can calculate the physical location of the sector.

The WSL, RSL and WSSL (and lists, complimentary to them: WBL, WSBL and RBL) can be recreated by the microprocessor 11 after removal and restoration of power to the memory system 10 by reading the logical addresses in the headers of the sectors in the series written since the last SAT rewrite. The starting sector address in the series and the links between blocks containing sectors in the series is obtained by the microprocessor from entries in a special data structure called the Control Block (CB) in Flash memory. (The Control Block (CB) is described in detail later). This method gives high security of data in the event of unexpected power removal from the card.

It will be appreciated that where a System Relocation Pointer (SRP) is included, as mentioned above, a System Relocation Sector List (SRSL) and complementary System Relocation Block List (SRBL) are also created and used in a similar manner as described above with regard to the WSL, RSL and WSSL, and the WBL, RBL and WSBL, respectively.

Figure 3:
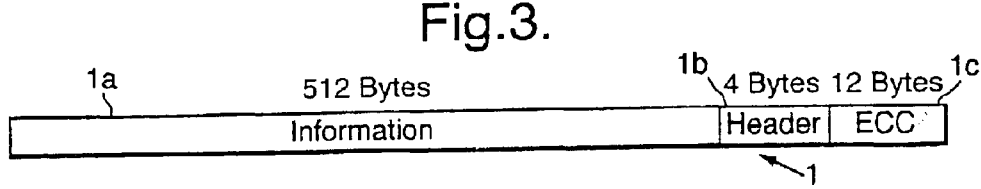
FIG. 3 is a schematic illustration of one page of data in a NAND or AND type FLASH memory.
Figure 4:
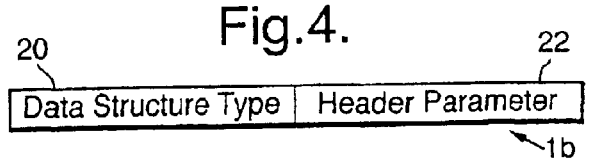
FIG. 4 shows the structure of a Header field of the page of FIG. 3.

The organisation of data in a FLASH Sector (i.e. page) 1 to which data is written by the controller 8, according to the present embodiment, is illustrated in FIG. 3. The Sector 1 contains a first, 512 Byte information portion 1a which may, for example, consist of a host data sector, followed by a 4 byte header portion 1b, followed in turn by 12 Bytes of ECC 1c. As shown in FIG. 4, the Header portion itself comprises a Data Structure Type portion 20 and a Header Parameter 22 (e.g. comprising the logical sector address (LA) of a host data sector written in the information portion 1a. The Data Structure Type can have values representing any one of the following: Data Sector; Deleted Data Sector; Sector Address Table (SAT) page; Additional SAT Block (ASB) page; Control Block (CB) page; and Boot Block (BB) page.

Deleted Data Sector

A deleted data sector physically exists temporarily in the FLASH memory only in blocks which are permitted to contain obsolete or deleted sector data i.e. the COB or COSB. It is identified by the all zero, state of the Data Structure Type field in the header, or other means as appropriate.

Sector Address Table (SAT)

The SAT is a series of entries containing the physical address of logical sectors. Entry N contains the physical address for logical sector N. Entries within a page occupy the 512 bytes of the information portion 1a of the data stored in the page. Because a SAT page is written in a single operation, the EEC field may be used to protect the complete page, and separate ECC fields for each entry in the SAT page are not required.

The SAT is actually stored as a series of blocks, each block containing up to 64 SAT pages. A separate data structure, the Table Block List (TBL), is held in the Control Block (described later) to define the block addresses of all SAT blocks. Each SAT entry defines the physical address of a sector and occupies 3 bytes and as shown in FIG. 5 comprises:

Chip Number 5 bits, allows 32 chips to be addressed

Block Number 13 bits, allows there to be 8192 blocks per chip

Sector Number 6 bits, allows up to 64 sectors per block.

The Header Parameter field on a SAT page data structure contains the SAT block and page number.

A Flash card with capacity 8 MB and 8 VB blocks can store approximately 16 K sectors, and its SAT will therefore have approximately 16 K entries. A 512-byte page within a SAT will contain 170 entries, and the SAT will therefore occupy almost 96 pages, which will occupy 6 blocks. A SAT for a large FLASH memory card (2 GB, 8 VB blocks) occupies 1543 blocks.

Additional SAT Block (ASB)

An Additional SAT Block (ASB) is a dedicated block which may be linked to a specific SAT block to allow single pages of the SAT block to be modified (i.e. rewritten). There can be several ASBs, each of which acts as an extension to the SAT block to which it is linked. When a SAT block is to be modified, it generally contains modified data in only a small number of its pages. The ASB allows only these modified pages to be rewritten. This is a much faster operation than the writing of every page and erasure of the obsolete block which is required for rewriting a SAT block. The Header Parameter portion of an ASB page contains the SAT block to which it is linked and the SAT page number within that block which it replaces. The format of the information portion 1a of data stored in an ASB page is identical to that of a SAT page.

Control Blocks (CBs)

The Controller 8 stores some control and address information in one or more Control Blocks (CBs). The CBs are updated periodically by the controller 8 and must be accessed during initialisation of the memory system 10 or occasionally during operation. Information is stored in the CBs in entries of a fixed size which can be independently written. There are 9 entries per page in each CB. An entry relates to one of the following list of data types, which are identified by a CB Header field in the entry itself:

Table Block List (TBL)

Map of blocks with some fields in the entry corresponding to a file data write operation (WMAP)

Map of blocks corresponding to a system data write operation (SMAP)

Map of blocks corresponding to a relocate sector operation (RNAP)

When new data must be added to the CB, an additional entry of the appropriate type is added immediately following the last valid entry. For large cards the CB may occupy more than one block. The addresses of all CB blocks are stored in a Boot Block (BB) in the FLASH memory 6.

For purposes of data security the first page (designated Header Page) of each block of a CB (and the BB also) does not contain entries and has a full page format of like that of FIG. 3. The Header Parameter field of the Header 16 of this page consists of a Signature, which identifies the CB, and its Block Number (which is the block's serial number within the set of Control Blocks).

The Information Field 1a of the Header Page of the first CB block is occupied by a Block Link Info data. The Block Link Info data provides all necessary information to restore the WBL, WSBL and RBL if the system has to be initialised following a CB rewrite operation. It comprises Link fields collected from all MAPs (WMAPs, SMAPs and RMAPS) written since the last SAT page write operation was performed and has to be written to the Header Page of the first block of a new CB during its rewrite operation. The Block Link Info is a timing ordered list of 4 bytes entries, each of which contains a block address of a block being visited by one of the write pointers and a flag identifying which pointer it was. A maximum number of blocks in memory space is allowed for CBs and when this becomes full, active entries are rewritten to the next available erased block(s) from the NEB (i.e. it is compacted and corresponding Header Pages are added), and the old CBs are erased. (At the same time a corresponding entry has to be added to the Boot Block.) The information field of a CB page contains 9 entries of equal length. The EEC field of a CB page is not used or may be used for other purposes.

An entry in a CB is 56 Bytes wide and has the format shown in FIG. 6 and comprises a Header 24 identifying the data type of the entry, an information field 26, and an EEC field 28. The EEC is of the same form as is used for a full page.

Table Block List (TBL)

The CBs contain the Table Block List (TBL). The TBL contains the addresses of a group of contiguous blocks of the SAT and any corresponding ASBs. Multiple TBLs are normally required to define all required SAT block addresses. The relevant TBL is written immediately after a SAT block write operation or allocation of a new ASB, to record the modified SAT or ASB block locations. The TBL also contains fields which are used to record write pointer positions at the moment when a SAT page write operation is to be performed. Therefore, a TBL is also written whenever a SAT page write operation is carried out. One entry of the TBL is shown in FIG. 7 and occupies the information field 26 of a CB entry. The first 1 Byte of the TBL entry is No, a sequential number of the TBL entry. Each TBL entry keeps values of 8 SAT—ASB block pairs, in other words each TBL entry keeps values for SAT blocks from N to N+7 where N is No*8.

WP is the Write Pointer Page field, RP is the Relocation Pointer field, and SWP is the System Write Pointer field. These fields determine the position of the WP, RP and SWP within the blocks after WSL, RSL, SSL release operation. WP, RP and SWP are valid only when WSL, RSL or SSL release operation is complete (i.e. at the last SAT write operation). This condition is set with the Flag bit in the entry Header. Flag=1 means the entry is the last one written during WSL or RSL release and so WP field is valid.

3 reserved bytes are left for possible future additions. SAT-ASB Pairs follow reserved fields, this is an array of 8 entries, each consists of SAT and ASB block addresses.

$SAT_N$ is the number of the Nth SAT block and $ASB_N$ is the number of the ASB linked to the $SAT_N$. If SAT or ASB doesn't exist the value of this field should be equal to zero.

New TBL entry should be added to CB each time SAT block is relocated or new ASB is linked to SAT block.

MAP (WMAP, SMAP and RMAP)

The CBs contain various MAP entries. There are three different types of MAP entry each of which corresponds to a different type of write operation; WRAP—to a file data write or delete operation, SMAP—to a system data write and RKAP to a sector relocation operation.

The information field of all the MAP entries has the same format. It contains a BitMap defining the erase state of a group of consecutive blocks. The erase state of 256 blocks is defined by the 256 bits in a 32 byte field in the MAP. The information field contains a Range field identifying the group of blocks to which it relates. Another field defines the destination block for a transition of the write pointer between blocks. The MAP also contains fields identifying the location of blocks in flash memory containing obsolete data; ObsC is used for the COB (or COSB) and ObsP—for the Pending Obsolete Block. If obsolete block is not present corresponding field is set to 0. The EB field contains an address of a block in which erasure is caused by current write or delete sector operation. If there is no such block the EB field is set to 0. This MAP entry format is illustrated in FIG. 8.

When one of the write pointers is moved from one block to another, a corresponding MAP entry must be added to show the use of an erased block (the BitMap field is updated) and to record the link between the blocks (the Link field is updated). When a write (or delete sector) operation produces obsolete (or deleted) data in a new block, a corresponding MAP also must be added to record a new obsolete block position (ObsC or/and ObsP fields are updated), to indicate that a block has to be erased (the EB field is updated) and to show that a new erased block is going to appear (the BitMap field is updated). Therefore, normally, at least two fields of a MAP are written at the same time and this may be achieved in a single page write operation.

Boot Block (BB)

The function of the Boot Block is to provide high security of data in the event of unexpected power removal from the card and at the same time avoid extensive scanning during initialisation procedure. For large cards the BB contains more than one block. The BB always occupies the first nondefective block(s) in the card. For purpose of data security there is a copy of the BB occupying the next nondefective block(s) in the card. Both the BB and its copy must be put to the same place after being rewritten.

The BB has the same structure as the Control Block and contains the following types of entries:

Signature

Interleaving Enable

Bad Block List

Control Block Pointers Table (CBPT)

When new data must be added to the BB, an additional entry of the appropriate type is added immediately following the last valid entry. The Signature and the BBL entries have just the same format as described before (of course, the signature field in the signature entry is different and unique). The Control Block Pointers Table entry contains pointers to all blocks of the CB and has to be updated immediately after the CB is rewritten.

Previous Link (PL)

The CB(s) also contain the Previous Link (PL). The purpose of the Previous Link is to provide all necessary information to restore the WBL (described later) if the system has to be initialised following a CB rewrite operation. It comprises Link fields collected from all MAPs written since the last SAT page write operation has been performed. The PL has to be written only to a new CB during its rewrite operation.

Data Structures Stored in SRAM of Controller

Various data structures are stored in the SRAM 13 of microprocessor including the following:

Write Sector List (WSL) (or "whistle)

The Write Sector List records the logical addresses of sectors written after the last SAT write. Its purpose is to allow correct logical-to-physical address translation for such sectors. The WSL has capacity for 128 entries of length 4 bytes, where each entry stores the logical address of the first sector in a group of consecutively written sectors and the group length The sector groups cannot jump from one block to another. The WSL is empty immediately after a SAT write.

The ordering of logical sector addresses in the WSL exactly matches the order in which they were written. A non-volatile copy of the WSL in Flash memory is therefore automatically provided by the headers of the actual sectors written at consecutive locations starting at that defined by the Write Pointer (WP) at the time the SAT was last written. There is therefore no need to explicitly make copies of the WSL to Flash memory 6. If necessary, these sectors can be scanned from a starting address defined in a Control Block field which contains the position of the Write Pointer (WP) at the time the SAT was last written, along with the Link fields from subsequent MAP entries.

Search of the WSL is performed in reverse order, since only the last entry for any logical sector is valid. Duplicate earlier entries may not have any corresponding obsolete sector located in Flash memory because sector relocations and block erasures may have been performed. If preferred, the controller is configured to simply remove duplicate entries from the WSL.

Two similar lists, the Relocation Sector List (RSL) and System Sector List (SSL), are also compiled in the microprocessor SRAM 13 recording the logical addresses of relocated sectors and System data sectors (written to addresses pointed to by the RP and SWP respectively) written since the last SAT write.

An ASB and/or a SAT block is supplemented with WSL, RSL or SSL entries every time the WSL, RLS or SSL respectively is full. This procedure is called WSL, RSL or SSL release. This release can cause ASB release if necessary. ASB release occurs when an ASB is full. When an ASB is full the respective SAT block is rewritten and the ASB is erased. Information about written pages in all ASBs should be stored in RAM to avoid frequent ASB scanning. An ASB List (ASBL) for this purpose is stored in the SRAM 13.

The ASBL is a list of all the ASB blocks currently linked with SAT blocks, there being one entry in the ASBL for each ASS. FIG. 9 illustrates the format of one entry in the ASBL, where:

LWP=number of last written page in this ASB block

NvP=number of the valid pages in ASB block minus one.

ASB Page 0 . . . ASB Page n=an array, index is ASB page number, value is corresponding SAT page number.

N=pages per block.

Write Block List (WBL)

The Write Block List is complementary to the Write Sector List and is created in microprocessor SRAM 13 to define the blocks within which the sectors in the WSL are located. The WBL is empty immediately after WSL release.

The WSL and WBL are recreated by a scanning process during initialisation of the memory system. The lists in SRAM which are created in this way will exactly match he lists which existed before power was last removed.

Two similar lists to the WBL named the Relocation Block List (RBL) and System Block List (SBL), are also compiled and stored in the SRAM 13, these lists being complimentary to the RSL and SSL respectively. The RBL and SBL define the blocks within which the sectors in the RSL and SSL respectively are physically located, and are of similar format to the WBL. The RSL, RBL, SSL and SBL can also be recreated by a scanning process during initialisation of the memory system.

Current Obsolete Block (COB)

Only one block is allowed to exist which contains obsolete or deleted sector data written by the Write Pointer (WP). This is named the Current Obsolete Block (COB). When obsolete or deleted sector data is created in another block, an erase operation must be performed immediately on the block defined as the COB. The current block address of the COB and also a list of sectors which became obsolete or were deleted in this block are stored in the microprocessor RAM 13 as a data structure hereinafter referred to as the COB Structure. The COB Structure is established during initialisation by copying a field containing obsolete block address from the latest. MAP entry, and then adding obsolete sector addresses after the reconstructed WSL and WBL have been analysed and reading deleted sector addresses from this block. The COB Structure is updated every time a new delete sector operation is performed or a new obsolete sector is created, and the block address is copied to a current MAP entry in the CB every time obsolete data is created in a new block.

There is also allowed to exist one block which contains obsolete or deleted sector data written by the SWP, named the Current Obsolete System Block (COSB). The COSB Structure is also stored in the SRAM 13 in a similar manner to the COB Structure. The COB and COSB each have the format shown in FIG. 10, namely a 4 byte Block Number field 28 (this is the block address of the COB or COSB) and a 32 byte Obsolete or Deleted Sector Mask 30 which is a BitMap containing ones in positions corresponding to obsolete or deleted sectors inside this block. For a block comprising 256 pages this mask 30 takes 32 bytes.

Next Erased Block List (NEB)

The Next Erased Block list is created in the microprocessor SRAb 13 in order to provide fast identification of the next available erased block when incrementing the WP, SWP and RP between blocks. Available erased blocks are used in ascending order of their physical addresses. The NEB contains M erased block addresses, (e.g. M=8). The NEB list is a list of next available erased blocks, starting with the erased block with block address closest to and higher than the address of the last erased block to be allocated for use. Thus, although the number of entries in the NEB is limited (e.g. to 8), the NEB itself may contain information about more than the next eight erased blocks.

The Next Erased Block list is derived from the MAP entry (stored in CB) appropriate to the region of Flash memory address space being accessed by the write pointers. This will remain in SRAM as the active NEB until all erased blocks defined by it are used, at which point it must be recreated from the appropriate MAP entries. The CB contains sufficient MAP entries to define the erase state of every block in Flash memory. Both the NEB and the corresponding MAP entry are updated by addition and removal of blocks during operation of the memory system. An entry is removed from the NEB when an erased block is allocated for sector or control data storage. An entry is added to the NEB (unless the NEB is already full) when an erased block is created at a block address which lies within the range spanned by the other blocks in the NEB.

A single NEB entry defines a group erased blocks at contiguous addresses, and defines the block start address (the first block address in the contiguous group of blocks) and the group length (number of contiguous blocks in the group).

TBL Pointers (TBLP)

The TBL Pointers identify positions of TBL entries in the CB. They are also stored in the microprocessor SRAM and are used to provide fast sector address translation. The TBLP is created during initial scanning of the Control Block, and then is updated every time a new TBL entry is created in the CB.

ASB List (ASSL)

As aforementioned, the ASBL is created in SRAM 13 and supports fast address translation. It identifies the physical addresses of all ASB blocks and the SAT blocks with which they are associated. It is created during initialisation and has to be updated each time a SAT page write operation is performed. The ASBL entries are listed in order of previous accesses, that is, when an entry is accessed it is promoted to the top of the list. When a SAT block which does not currently have an associated ASB is accessed, an ASB is allocated and an entry for it is added at the top of the ASBL. The bottom entry of the ASBL, representing the least recently accessed ASB, is eliminated.

SAT Cache

A cache is maintained in the SRAM 13 for 32 contiguous SAT entries incorporating the entry most recently accessed from a SAT in Flash memory.

Capacity Map

Total Flash memory capacity in the memory system 10 is allocated to data and control structures as follows:
1. Logical Sectors Capacity is allocated to storage of one valid data sector for each logical address within the declared logical capacity of the card. This declared capacity is the available physical capacity minus items 2 to 8 below, and is defined by the formatter during card manufacture.
2. Boot Block At least one block is allocated to the boot block. Preferably, a second block is allocated for storing another copy of the boot block.
3. Control Block A number of blocks are allocated to storage of Control Block entries (Signature, BBL, TBL and MAP). The fully compacted Control Block occupies less than one block in most cases. Additional blocks are allocated to the Control Block for entries written between compaction/rewrite operations.
4. Sector Address Table This is the capacity allocated to the storage of the blocks of the SAT. It is proportional to the logical capacity of the card.

5. Additional SAT Blocks

A fixed number of blocks are allocated for ASBs to be associated with defined SAT blocks.

6. Obsolete Sectors

One block is allocated for the COB. Another block is allocated for the COSB and one further block is allocated for the POB (for embodiments which allow the existence of a COSB and POB). The maximum number of permitted obsolete data sectors is therefore set by the number of pages in a block.

7. Erased Buffer

This is a buffer of erased blocks which must be allocated for correct operation of the system. At least one erased block must be allocated for data sector relocation and one for control structure relocation which may take place concurrently.

8. Spare Blocks

Spare blocks may be allocated for use to maintain declared logical capacity in the event of a failure during operating life. The number of spare blocks is determined by the formatter during card manufacture.

A Capacity Allocation Table illustrating, for example purposes, capacity allocated to the above items 1–8, for an 8 MB card, 64 MB Card and 512 MB Card (FLASH Cards) is shown in FIG. 16 (this shows only one block allocated for obsolete sectors, namely for the COB, but it will be appreciated that more blocks will be allocated for obsolete sectors where there is provision for a COSB and/or POB in the memory system).

SAT Write Operations

The SAT is rewritten when the WSL, WBL, SSL, SBL, RSL or RBL, is full and, in the majority of cases, it is done with a granularity of one page, that is, only SAT pages containing modified sector addresses are rewritten. However, in a small minority of cases, full SAT block rewriting is required (designated "SAT block write"). When a SAT rewrite is required, an Additional SAT Block (ASB) is created, into which only the required pages are written (designated "SAT page write"). There can only be one ASB dedicated to a specific SAT block, and totally, there may exist a limited number N of ASBs. The value of N will be chosen as an appropriate compromise between write performance and capacity overhead (for example, N=8).

Each ASB exists until a "SAT block write" is performed on its associated SAT block. A SAT block write is performed when a SAT write page is required on a SAT block whose ASB is full or an ASB is to be deallocated. When a SAT page write is required and the corresponding SAT block does not have an associated ASB and all N ASBs are already allocated, one of the existing ASBs has to be deallocated before allocation of a new ASB. The ASB to be deallocated is selected as the one which has not been written for the longest time. Note that deallocation of an ASB is rather time consuming procedure as it requires writing of a SAT block and also erasure of both the obsolete SAT block and ASB.

Interleaved Chip Access

The above described operations and data structures inherently allow interleaved write operations to be performed on several Flash chips 5 and this can significantly increase performance. The controller chip 8 may thus control a plurality of FLASH chips 5, for example an array of four FLASH chips, incorporated in the memory system. The memory space of the four FLASH chips is organised by the controller as a set of virtual blocks, each of which consists of four blocks 4, one block from each of the four chips 5 (which chips are permanently linked together). The four blocks in each virtual block are the blocks with the same block address within a chip. This organisation allows linked blocks forming a virtual block to be treated as one large block and, therefore, to use all the same described algorithms and data structures as previously described for a single FLASH memory system 10, using virtual blocks instead of the individual erasable blocks of sectors. Page write operations are performed concurrently across all interleaved chips. The Write Pointer (WP) and the RP and SWP each move sequentially through page addresses, and the ordering of address bits supplied to a hardware chip enable decoder provided in the controller 8 ensures that pages of linked blocks are sequentially accessed in the order illustrated in FIG. 11 i.e. each pointer WP, SWP, RP moves from one chip to another when moving from one PA to another PA. This is achieved by the use of Virtual Addresses. A unique Virtual Address (VA) is allocated to each physical sector (e.g. in the above-described NAND based memory system a VA is allocated for each page) in all of the chips. The Virtual Addresses are allocated such that incrementing the VA by one moves the write pointer from one chip to the next chip, the Virtual addresses incrementing from chip to chip, though linked blocks of each virtual block, in a repeating pattern as shown in FIG. 11.

The controller in effect treats the array of memory chips as a single column of virtual blocks. The Virtual Address of a sector takes the format shown in FIG. 12. This consists of a Virtual Block portion comprising a ChipHigh portion and the 13 bit Block address of the sector, and a Virtual Page portion Comprising the 6 bit page address and a ChipLow portion. The ChipHigh portion is $C_{high}$ bits of the 5 bit chip number (of the physical address—see FIG. 5) and the ChipLow portion is $C_{low}$ bits of the 5 bit chip number, where:

$C_{high}$=column number of chip in array of chips; and $C_{high}$=row number of chip in array of chips.

To obtain the Physical Address (PA) from the Virtual Address (VA), the controller simply re-organises the VA so as to move the ChipLow portion back between the ChipHigh and Block address portion, as shown in FIG. 13. Thus, it will be. appreciated that in a single chip memory system for any sector the VA is equal to the PA.

For simplicity, only a number of chips which is a binary multiple may be interleaved, for example, 2 or 4. Erase operations on virtual blocks are performed as concurrent erasures of all linked blocks of interleaved chips. If a block in a chip is a bad block the controller treats all the blocks having the equivalent block address in the other chips as bad blocks.

Interleaving is enabled or disabled according to the status of a control byte in the Boot Block which is set in enabled or disabled status by the manufacturer of the memory system when the FLASH memory is formatted.

Where block addresses or PAs were previously used in the above-described single chip NAND type FLASH embodiments, we now use Virtual Block addresses and VAs, respectively. On receipt of a host data sector write command the controller translates an incoming LA to a PA by allocating the PA to which the relevant write pointer is pointing. The controller controls the write pointers to each move through the PAs so as to, in effect, move sequentially through the Virtual Addresses (VAs) of the sectors of those of the virtual blocks which are erased (which erased virtual blocks are identified in the NEB).

Figure 14B:
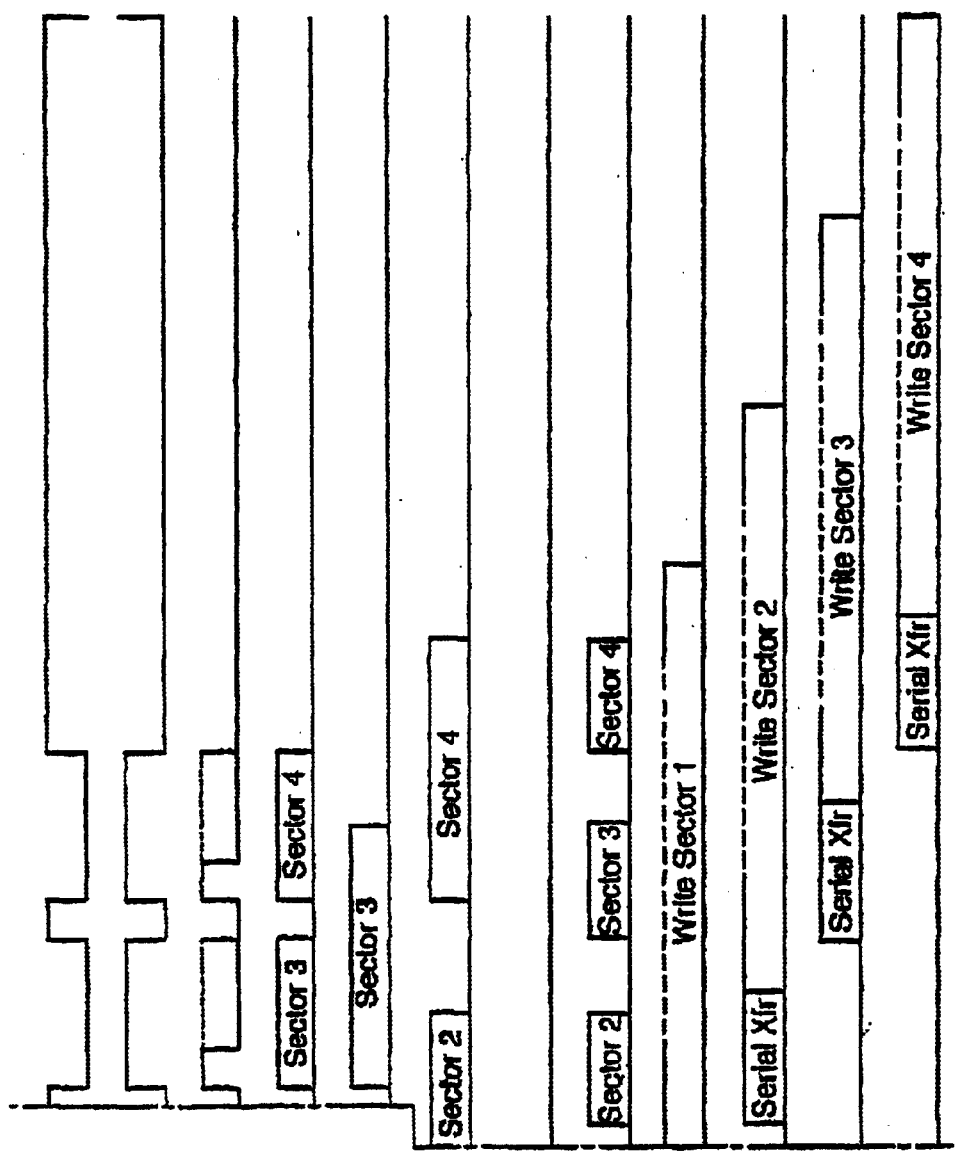
FIG. 14 illustrates the timing of operations during a multiple sector write to a multiple FLASH chip memory system according to the invention.

FIG. 14 illustrates the timing of the various operations involved in a multiple sector write to interleaved chips. FIG.

Figure 19:
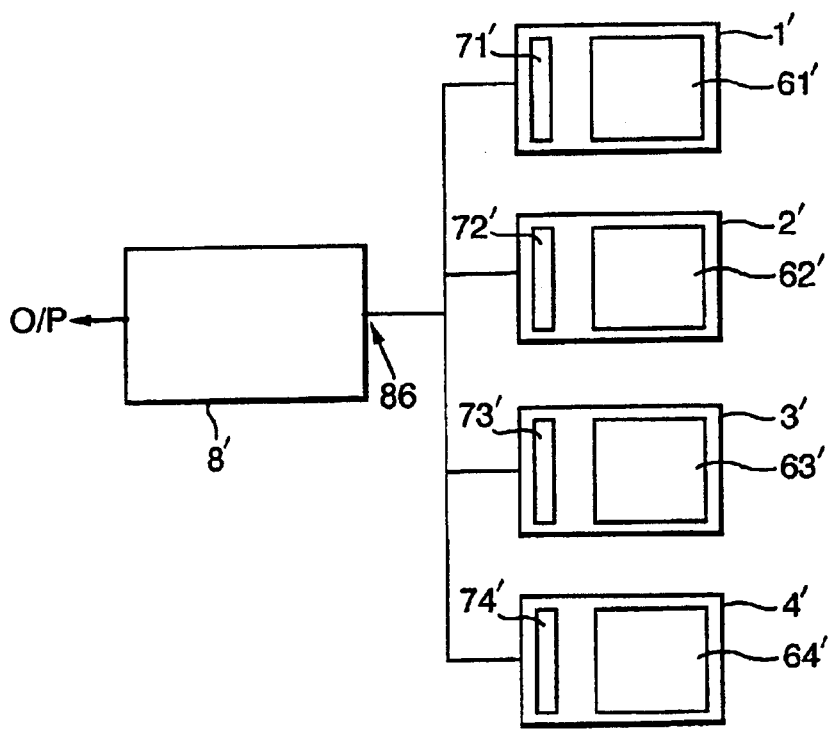
FIG. 19 is a block diagram of a multiple FLASH chip memory system comprising four FLASH chips and a controller chip.

14 will now be described with reference to FIG. 15 and FIG. 19. FIG. 15 is a block diagram illustrating in detail the controller chip 8 of the memory system. (The controller chip 8 of FIG. 2 may be of the form shown in FIG. 15 and like parts in both FIG. 2 and FIG. 15 are numbered with the same reference numerals). FIG. 19 is a schematic diagram of a memory system 10 comprising the controller chip 81 and four FLASH chips $1^1, 2^1, 3^1, 4^1$ each with its own read/write buffer $71^1, 72^1, 73^1, 74^1$.

FIG. 15 shows the controller chip $8^1$, with an input/output port O/P e.g. a PC Card ATA Port, Compact Flash or IDE Port, for connection to a host computer; a Host Interface & Registers 80 connected to O/P and a Dual-Port SRAM Sector Buffer 9 connected thereto; A Datapath controller 82, the ECC Generator & Checker 12, and a Flash Memory Interface (FMI) 84, all connected to the Sector Buffer 9, the FMI also being connected to a Flash Memory Port 86. The controller 8 also includes microprocessor 11 (in the form of a RISC Processor); processor SRAM 13,; a processor Mask ROM 88; and a port for an external Program RAM or ROM 92. An optional Debug Port 94 may also be provided for the RISC processor 11. Data and commands are communicated between the various components of the controller 81 (except for the Sector Buffer 9) via a microprocessor Bus 91.

As shown in FIG. 14, when a multiple sector write command (in this case a 4-sector write comprising Host Data sectors 1, 2, 3 & 4) is received at the ATA Port O/P, Sector 1 is written into a Buffer 1 of the Dual-Port Sector Buffer 9. This leaves a Buffer 2 of the Sector Buffer 9 available for controller data management operations. When Sector 2 is received it is written directly into Buffer 2 and at the same time Sector 1 is moved from Buffer 1 to the Flash Memory Port 86 from where it is written into the read/write buffer $71^1$ of one of the four FLASH chips (chip $1^1$). Sector 2 is then sent from buffer 2 to the Flash port 86 and on to the read/write buffer $72^1$ of one of the other four FLASH chips (chip $2^1$). While this is happening Sector 3 is received directly into Buffer 1 of the Sector Buffer 9. Sector 3 is written to the buffer $73^1$ of Chip 3 and Sector 4 is received into Buffer 2 of the Sector Buffer 9, and is then written to the buffer $74^1$ of chip 4. Sectors 1,2,3 and 4 are then written into the relevant allocated physical sectors in the memory arrays $61^1, 62^1, 63^1, 64^1$ of chips $1^1, 2^1, 3^1$ & $4^1$ respectively. Although FIG. 14 shows each such sector Write operation starting shortly after the previous one, in practice, to all intents and purposes, it will be appreciated that the four Sectors 1,2,3,4 are written substantially concurrently to the Flash Chips $1^1$ to $4^1$. Moreover it will be appreciated that the physical addresses of the sectors to which the Host Data Sectors 1 to 4 are written are determined by the algorithms previously described which determine the position of the relevant write pointer (i.e. sequential use of Virtual Addresses).

It will be appreciated that where a multiple-sector write command of more than four sector writes is sent from the host processor to the controller, the controller partitions the multiple-sector write into groups of (for the present embodiment using four memory chips) four sectors, each such group to be written to FLASH memory in an interleaved write to sequence as described above with reference to FIG. 14.

Address Translation

The process of address translation for an LA to a VA will now be described in further detail, with reference to read and write operations.

Address translation is an operation performed on the logical address of a sector which returns one of the following three values.

Valid sector physical address

Information that logical sector has been deleted (or has never been written)

Information that an error condition has occurred

Figure 17:
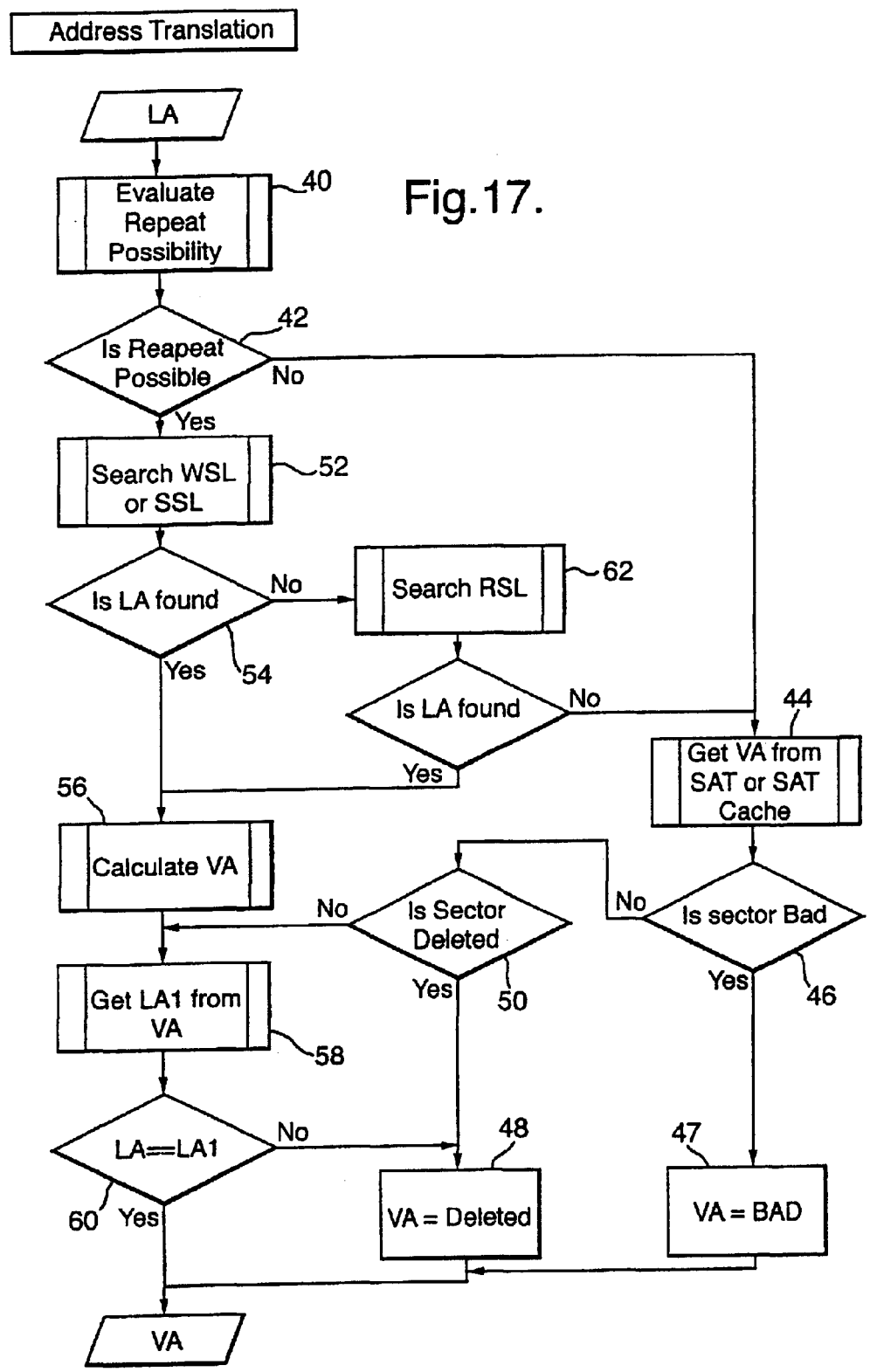
FIG. 17 is a flow diagram showing an Address Translation process.

FIG. 17 is a flow chart illustrating the address translation process. This process is carried out for every read operation. When a logical sector address (LA) to be translated is received by the controller $8^1$ from the host processor an algorithm is implemented (box 40) to identify the possibility that a sector whose logical address is to be translated has previously been written or deleted since its SAT entry was last written. A conclusion that a sector has not been previously written or deleted must be 100% certain; a conclusion that a sector may have been previously written or deleted should have a high probability of being correct. This is carried out by the processor by keeping a limited number of pairs of values representing the start and end addresses of contiguous sequences of sectors, and identifying whether an address to be translated lies within any of these ranges. These ranges may eventually become non-contiguous, leading to some uncertainty in a conclusion that a sector may have been previously written or deleted. If the LA lies within any of the ranges then we answer "IS Repeat Possible?" (box 42 of FIG. 17) with YES. If the LA does not lie within the ranges we answer NO and go to the SAT or SAT Cache to find VA (box 44). From here we determine whether the physical sector is Bad (46) or Deleted (50). If the LA corresponds to an unwritten sector this results in VA=Deleted (58) at box 50. If we answer Yes at box 42, then we search 52 the WSL or SSL (depending on whether the LA corresponds to file or system data). If at box 54 the LA is found (YES) the VA is calculated 56 and the logical address stored in the header 1b is of the physical sector is read by the controller microprocessor (at 58). If LA=LA1 (box 60) then the calculated VA is correct. If the LA is not found at 54 then we search 62 for it in the RSL and if it is not found in the RSL we go to the SAT or SAT Cache and get the VA from there 44. If the VA found in the SAT or Sat Cache is not Bad or Deleted 46, 50, then we get LA1 from the VA 58 and check if LA=LA1, as before.

Figure 20:
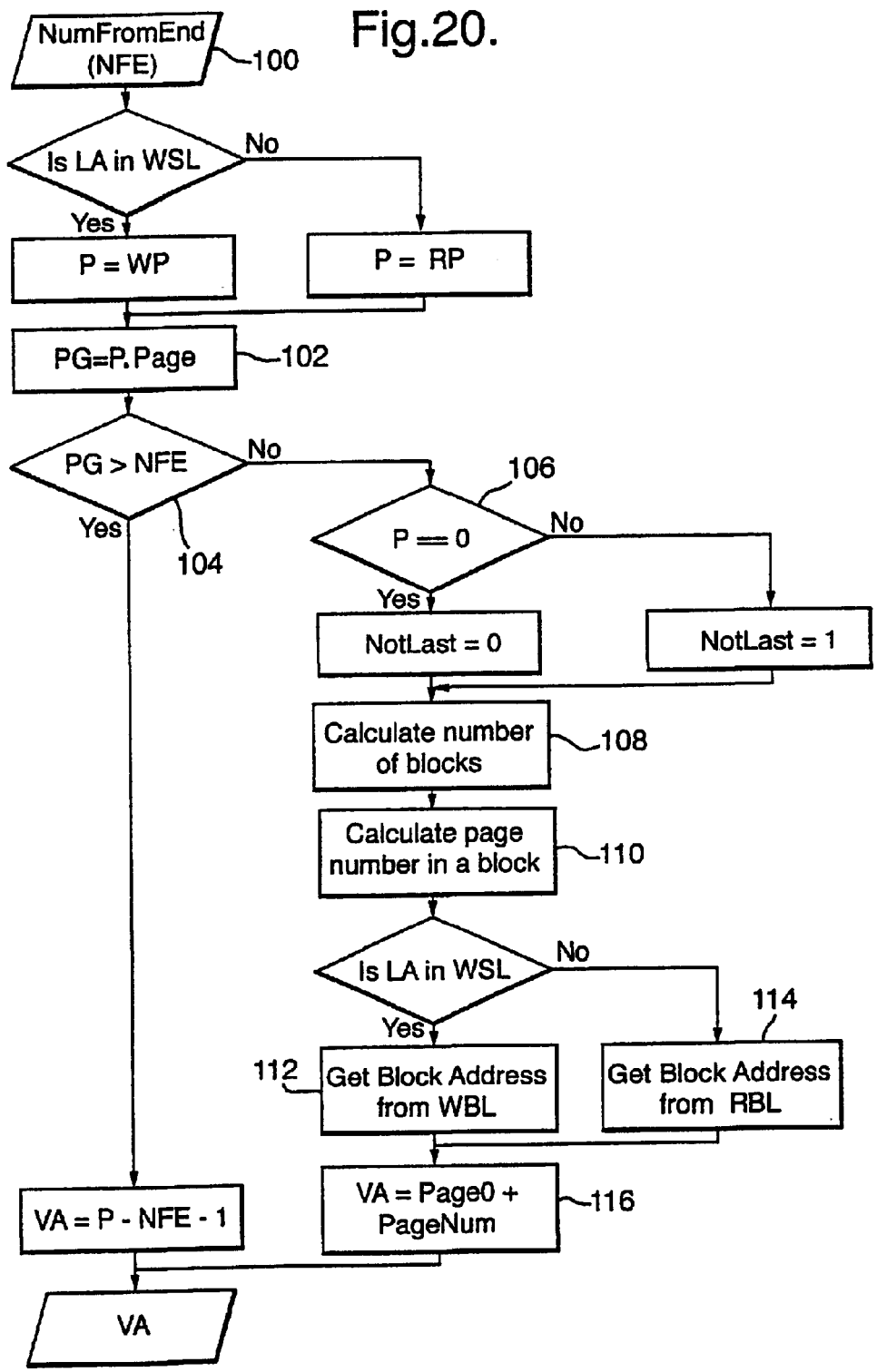
FIG. 20 is a flow diagram of the steps carried out at box 56 of FIG. 17.

The process steps carried out at box 56 (Calculate VA) of FIG. 17 are illustrated in detail in the flow diagram of FIG. 20. FIG. 20 illustrates the steps carried out in order to obtain the VA for an LA found in the WSL or RSL, for a memory system using only two write pointers , WP and RP. It will be appreciated that this flow diagram would be extended to also allow the VA for an LA found in the SSL, where the memory system also incorporates a System Write Pointer (SWP). The process starts at box 100 where we set NumFromEnd (NFE), where NumFromEnd=number of sectors written beginning from the end of the WSL (or RSL) up to the given sector (found in the WSL or RSL. If the LA was found in the WSL we set P=WP and if LA was found in the RSL we set P=RP; then we set PG=P. Page where P. Page is the page of the write pointer indicated by the value of P (see box 102). If 104 PG>NFE (i.e. LA is in the last written block) then VA=P-NFE-1, namely NFE-1 sectors away from the position of the relevant write pointer. If PG<NFE then we determine 106 if P==0, namely if a block corresponding the last WBL/RBL entry is fully written. If it is (i.e. P==0) we set NotLast=0, and if it is not we set NotLast=1. We then calculate 108 number of blocks, Nblock, between the last one and the block where the given sector lies, using the following algorithm:

Nsect is a number of sectors between last written block page 0 and the given sector;

Nsect=NumFromEnd−PG;

Nblock=NSect/BlockSize+NotLast

We then calculate 110 page number in a block, PageNum, where PageNum=BlockSize−NSect%BlockSize. If LA is in the WSL we then 112 get Block Address (BLAddr) from the WBL, or if LA is in the RSL we get 114 Block Address (BLAddr) from the RBL, where Block Address is a Virtual address of a block containing the given sector, using the following:

If LA is I WSL, then BLAddr=RBL[LBL−NBlock], where LBL is an index of the last entry in the WBL;

If LA is in RSL, then BLAddr=RBL[LRBL+NBlock], where LRBL is an index of the last entry in the RBL.

Then we calculate 116 the VA using: VA=Page0+PageNum, where Page0=Virtual address of page 0 in the block containing the given sector.

Figure 21:
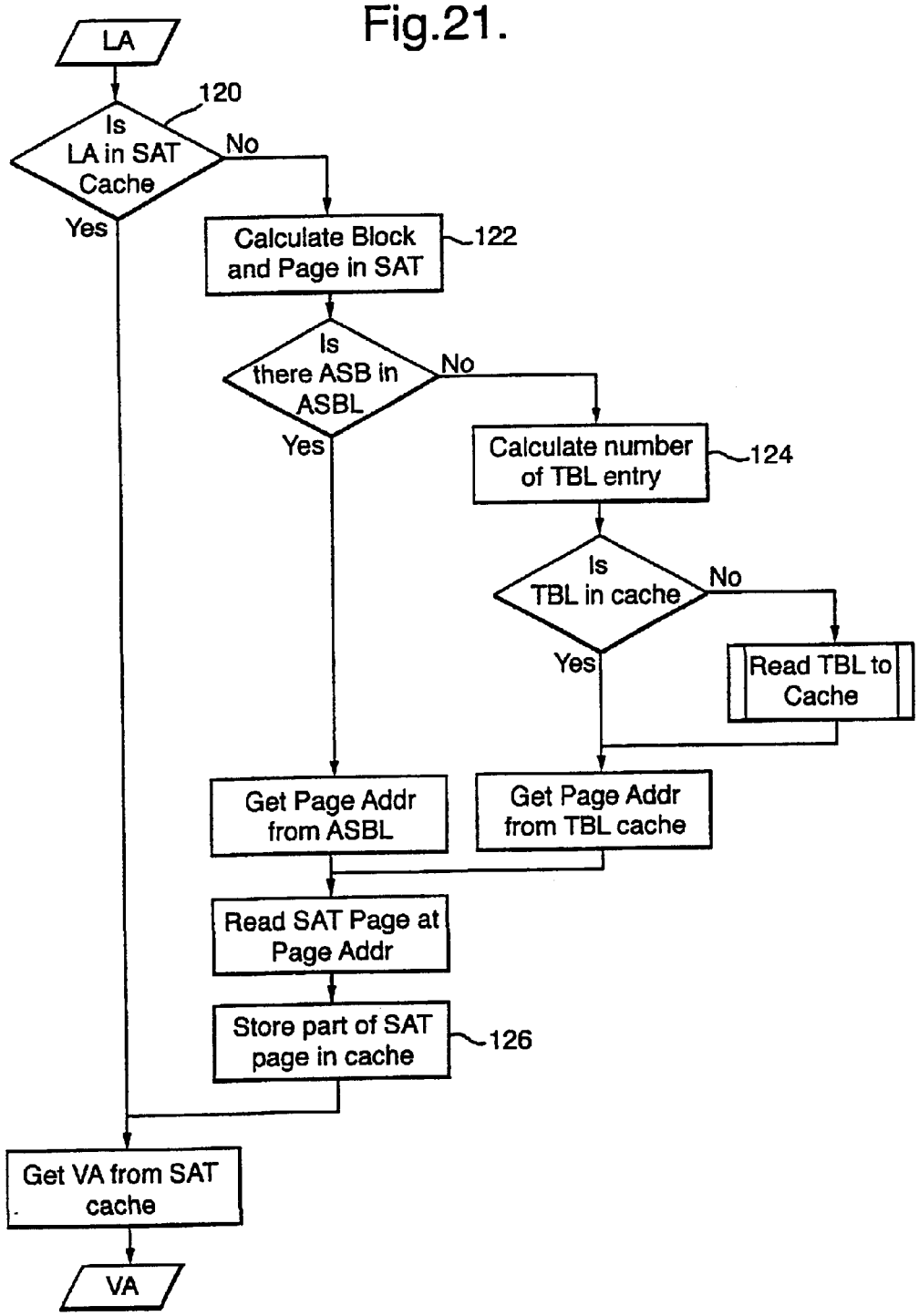
FIG. 21 is a flow diagram of the steps carried out at box 44 of FIG. 17.

FIG. 21 is a flow diagram of the process used to Get VA from SAT or SAT cache (box 44 in FIG. 17). FIG. 21 is generally self-explanatory but further comments regarding specifically labeled boxes is given as follows:

Box 120 (Is LA in SAT Cache): LA is in the SAT Cache if LA>=FirstCacheEntry.LA<=LA<FirstCacheEntry.LA+CacheSize, where FirstCacheEntry.LA=the LA corresponding to the first SAT Entry in the Cache, and (global) CacheSize= number of entries in the SAT Cache;

Box 122 (Calculate Block and Page in SAT): We calculate SBNum which is a SAT block number for the given LA, and Spage which is a SAT page number for the given LA;

Box 124 (Calculate number of TBL entry): TBLNum is a number of the required TBL Entry, where TBLNUM= SBNum/8; and Box 126 (Store part of SAT page in cache): If it is possible, 32 entries starting with the last entry accessed are cached.

If there are not enough entries then a group of 32 entries ending with the last entry in a page and including the last sector accesses is cached.

Figure 18:
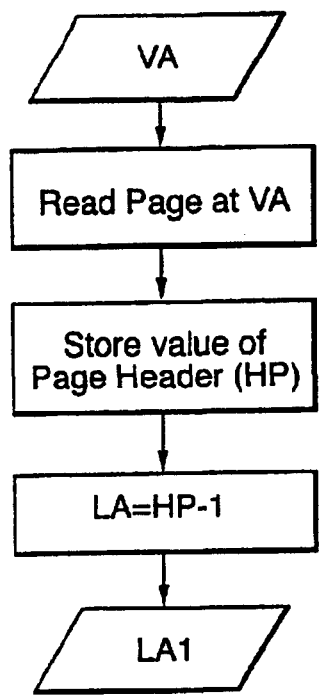
FIG. 18 is a flow diagram of the steps carried out at box 58 of FIG. 17.

FIG. 18 is a flow diagram illustrating the process steps for Box 58 (Get LA1 from VA) of FIG. 17. It should be noted that the Header Parameter (HP) stored in the Page Header will be the value of the logical address (LA) incremented by one. This is because deleted sectors are marked by setting all bits in their headers to zero. This LA=0 cannot be stored in a header. We therefore set LA1=HP−1.

Read Operations

Figure 22:
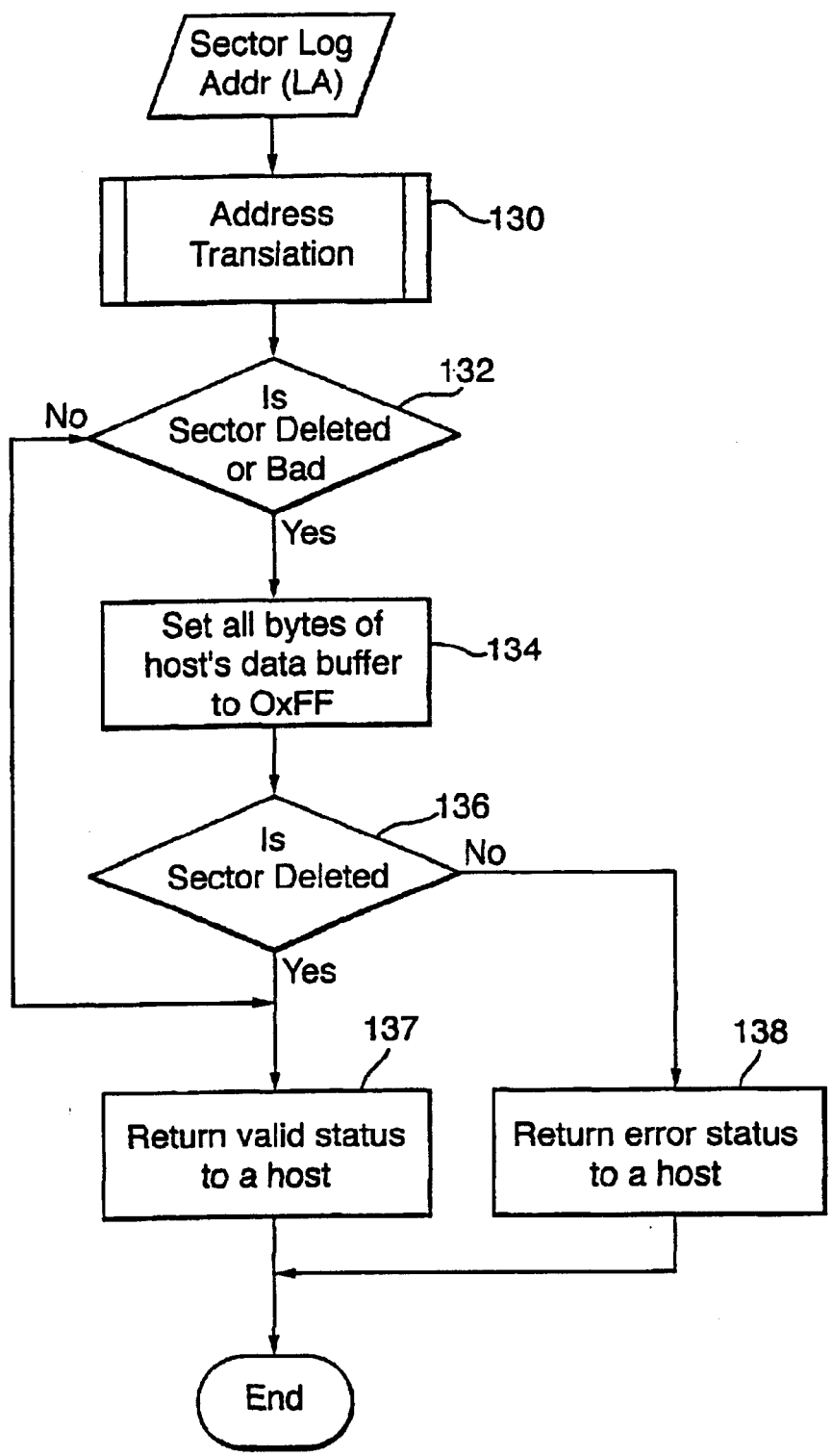
FIG. 22 is a flow diagram of a sector read operation.

FIG. 22 is a flow diagram illustrating the sequence of steps carried out to read a host data sector from a physical sector. The controller starts by translating the LA (received from the host) to a VA (box 130). This is done by carrying out the process illustrated in the FIG. 17 flow chart, already described once the LA has been translated to a VA, the content of the physical sector with address VA is read into the buffer 9 of the controller. The controller then checks (box 132) if the sector (i.e. the content of the sector) is deleted or bad. If it is deleted or bad, the controller sets all bytes of the host processor's data buffer to 0xFF (box 134). If the sector is not a deleted sector (box 136), the controller returns error status to the host (box 138). If the sector is a deleted sector, the controller returns valid status to the host (box 137). If at box 132 the controller determines that the sector is not deleted or bad, the controller goes straight to box 137 i.e. returns valid status to the host.

Write Operations

Figure 23:
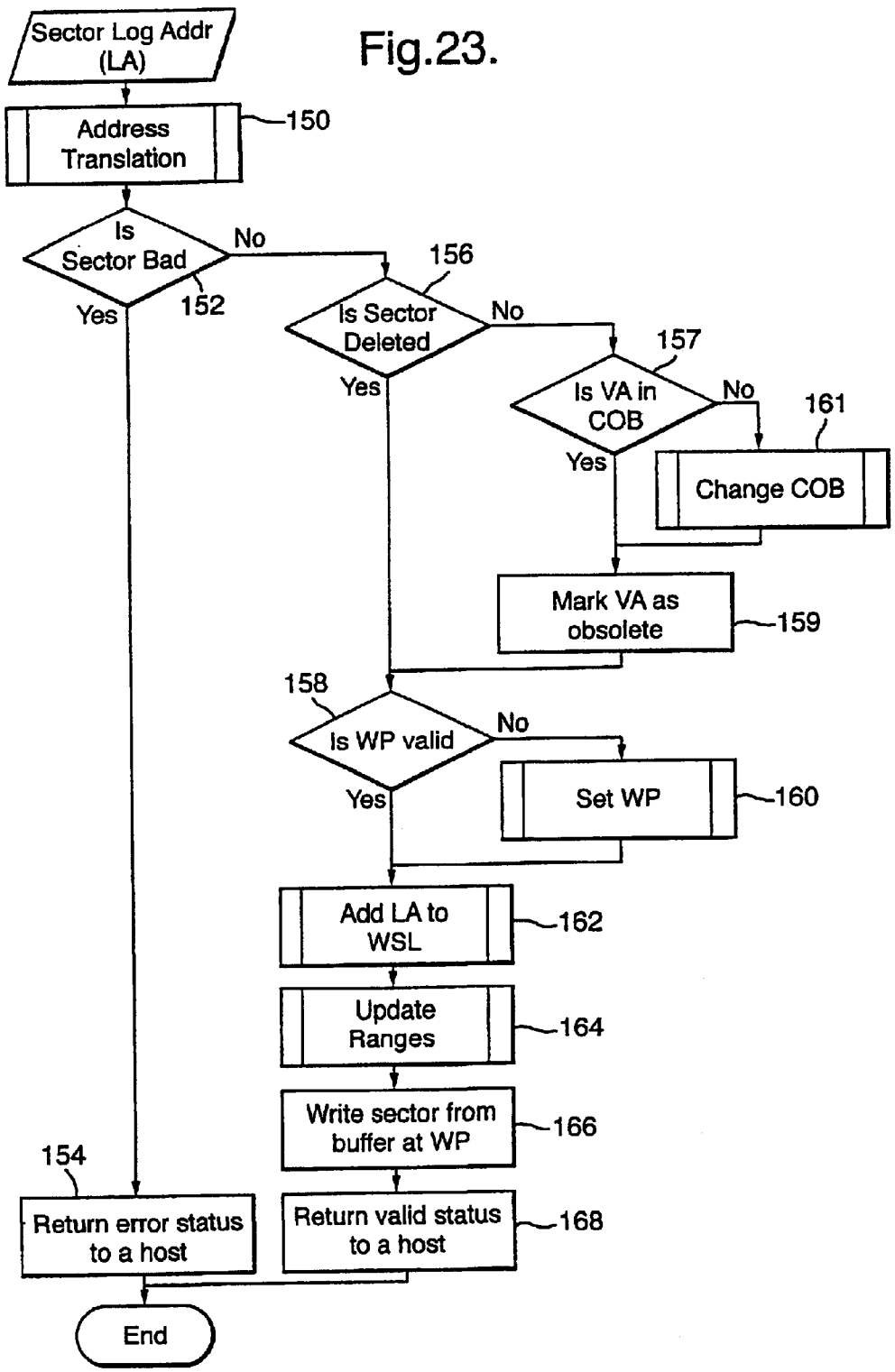
FIG. 23 is a flow diagram of a sector write operation.

FIG. 23 is a flow diagram illustrating the sequence of steps carried out to write a host data sector to a physical sector. FIG. 23 deals only with write operations for host file data, and thus written by the Write Pointer (WP), but it will be appreciated that the operations of FIG. 23 would be appropriately extended to deal with separate system data writes where the memory system uses a separate write pointer for system data (i.e. the SWP). The controller starts by translating the LA (received from the host) to a VA (box 150). This is done by carrying out the process illustrated in the FIG. 17 flow chart, already described. If 152 the sector is Bad, the controller returns error status 154 to the host. If the sector is not Bad, then check if the sector is deleted 156 and if it is deleted then check if WP is valid or invalid 158. WP is invalid (WP==0) when a full block has just been written and WP has to be moved to an erased block. If WP is not valid, we set the WP to a new (valid) physical sector address 160. When WP is valid, we add the LA to the WSL 162 and perform any WSL or RSL release, and/or CB and CBPT compaction, which is necessary. We then update 164 the ranges from the Evaluate Repeat Possibility algorithm (box 40 of FIG. 17) and write the sector 166 from the controller buffer to the address of the WP, and return a valid status value 168 to the host. If, at box 156, we find the sector is not deleted we then check 157 if the VA is in the COB. (The VA is in the COB if VA coincides with VB, where VB is a Virtual Block Number field (this is the Virtual Block address—see FIG. 12) in the COB structure stored in SRAM 13. If the VA is in the COB, we record VA as obsolete 159 in the COB structure stored in the controller SRAM 13 (this is done by setting a corresponding bit to 1 in the BitMask field of the COB Structure in SRAM 13.) and then go on to box 158 (is WP valid). If the VA is not in the COB we change the COB 161 and then move on to box 159 (Mark VA as Obsolete).

Figure 24:
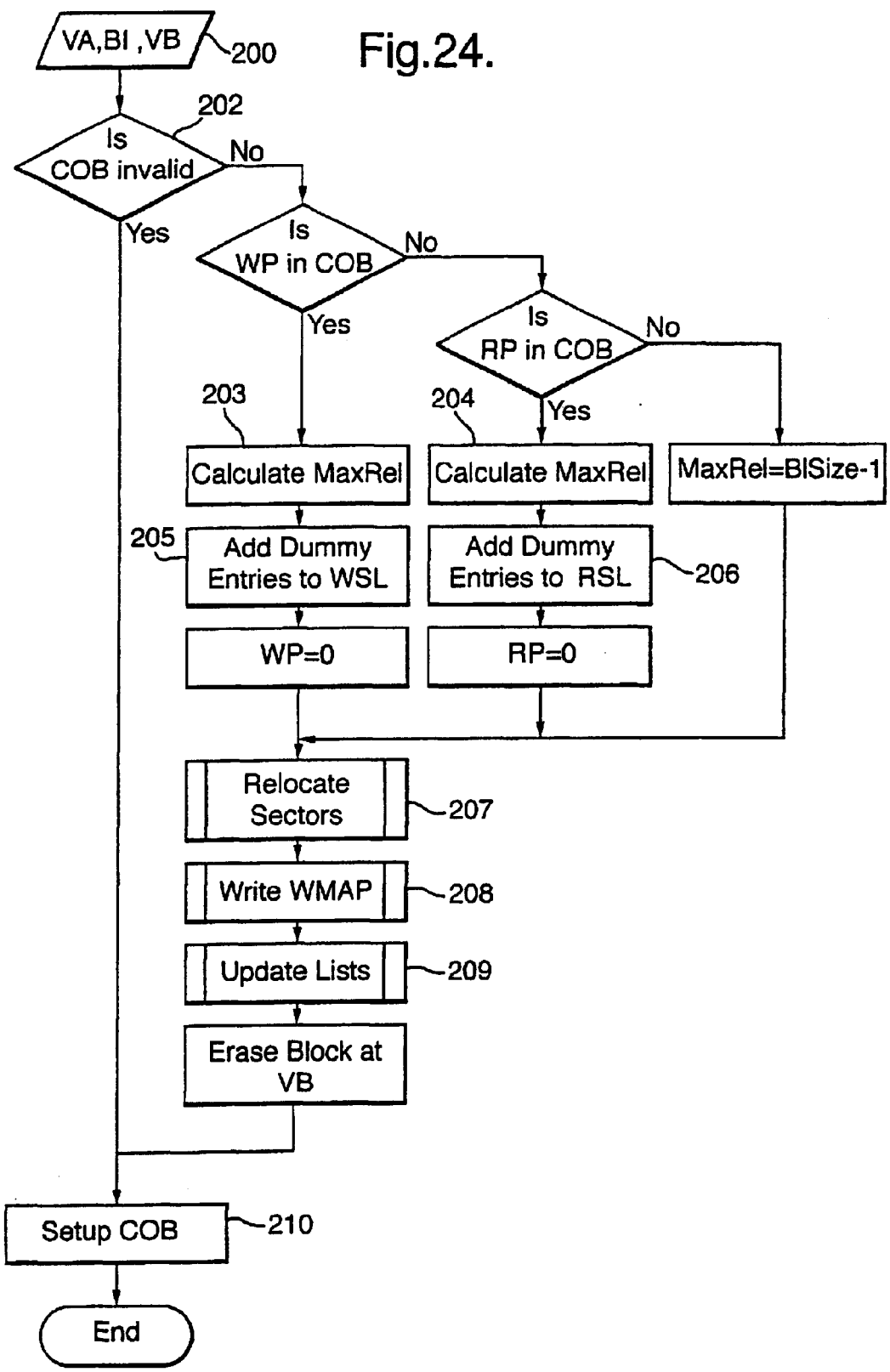
FIG. 24 is a flow diagram of the steps carried out at box 161 of FIG. 23.

FIG. 24 is a flow diagram of the steps implemented at box 161 of FIG. 23 (Change the COB). FIG. 24 is generally self explanatory but should be read in conjunction with the following notes:

Box 200 (VA. Bl, VB): VA. Bl is a Virtual Block field of VA, and VB is as above-described;

Box 202 (Is COB invalid): COB is invalid if VB=O. If VB is equal to zero this indicates that there are no obsolete data at this moment;

Boxes 203,204 (Calculate MaxRel): MaxRel is a maximum number of sectors to be relocated from COB. MaxRel=P. Page-1, where P. Page is a Page field (address) of the WP or RP;

Boxes 205,206 (Add Dummy Entries to WSL): If a block to be relocated is not fully written yet, corresponding "dummy" sector LAs must be added to the last WSL (RSL) Entry;

Box 207 (Relocate Sectors): See FIG. 25;

Box 208 (Write WMAP): Write WMAP to the CB where EB+VB and corresponding bit in the BitMap is set to 1. Perform CB rewrite if necessary;

Box 209 (Update Lists): Find WRBArray entry equal to VB and mark it and any other entries for the same VB in WRBArray as invalid. The WRBArray is in fact the WBL and WSL lists which are actually stored in the same area of memory with the WBL entries at the start counting up and the RBL entries at the end counting down. The WRBArray is full when the two lists meet in the middle.

Box 210 (Setup COB): Update COB Structure in SRAM, VB field is set to VA. Bl, Obs and Del Mask bit corresponding to VA. Page is set to 1, all other bits are set to 0.

Figure 25:
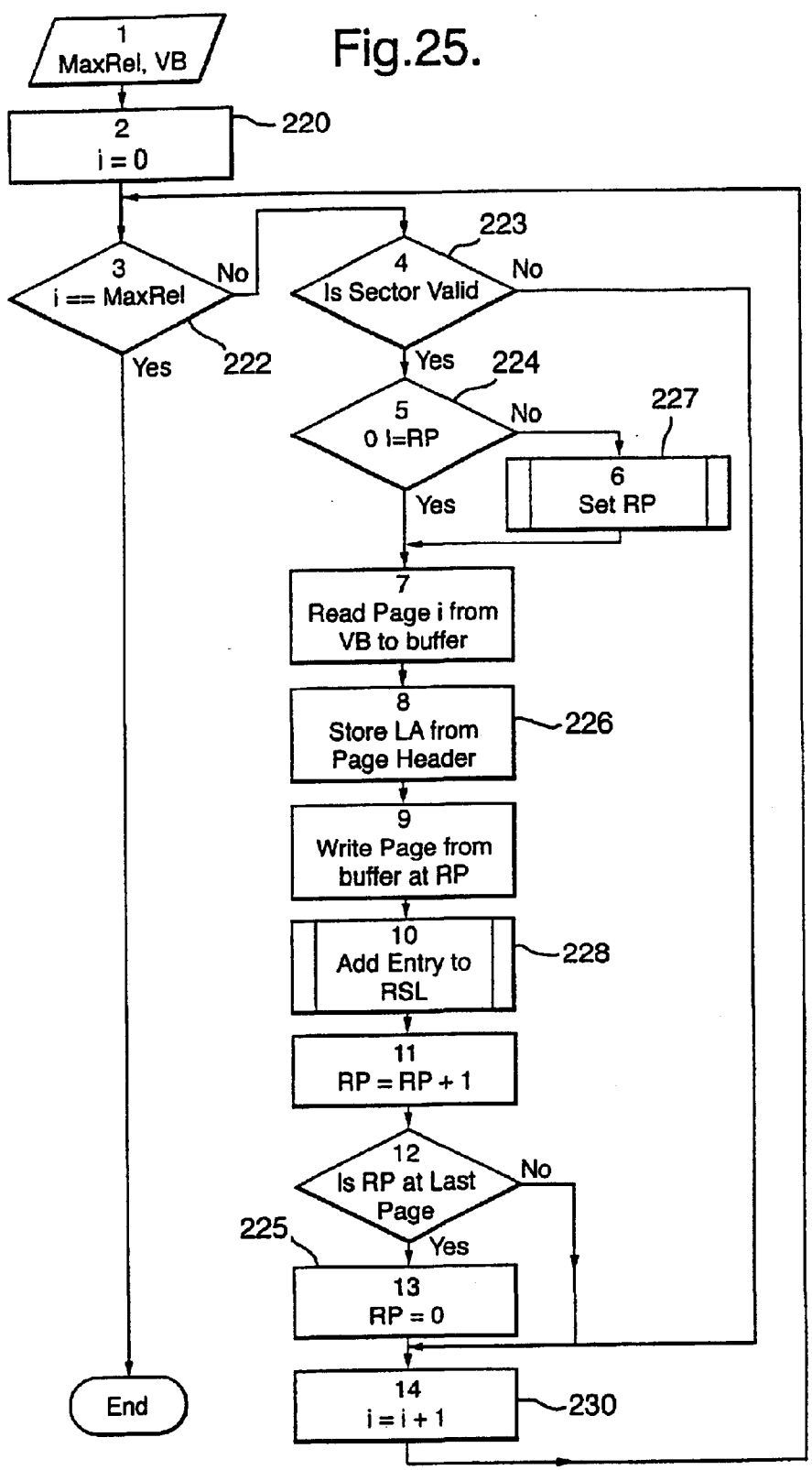
FIG. 25 is a flow diagram of the steps carried out at box 207 of FIG. 24.

FIG. 25 illustrates the steps implemented at box 207 (Relocate Sectors) of FIG. 24. This should be read in conjunction with the following notes:

Boxes 220, 222 and 230: Perform a loop going through Obs and Del Mask field of the COB Structure in SRAM;

Box 223 (Is Sector Valid?): Sector is valid if ODMask [i]=0; zero value in COB Obs and Del Mask indicates that this page contains a valid sector;

Boxes 224 and 225: RP=0 if a block pointed to by the RP is already fully written;

Box 226 (Store LA from Page Header): LA got from Page Header is temporarily stored to be used in Add Entry to RSL;

Box 225 (RP=0): Add Entry to the RSL. Perform WSL/RSL release, if necessary.

Figure 26:
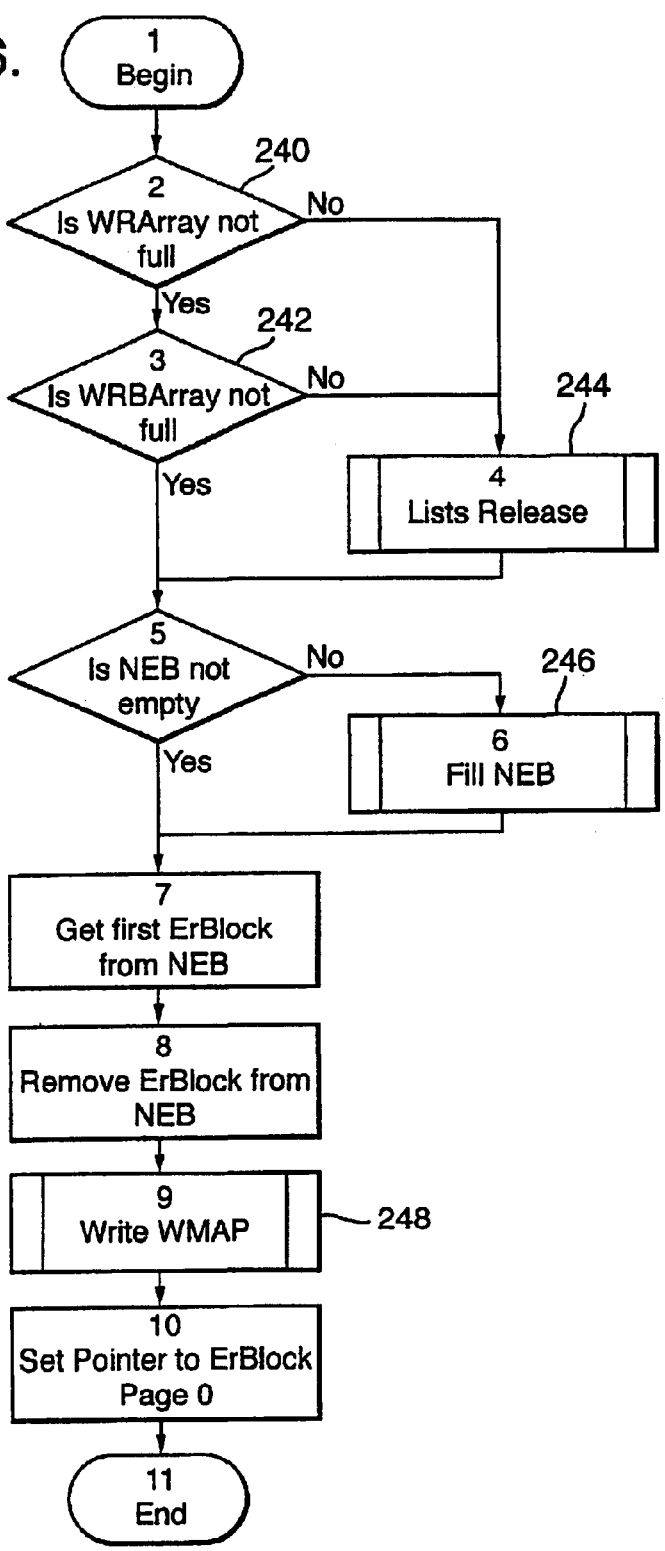
FIG. 26 is a flow diagram of the steps carried out at box 160 227 of FIG. 23.

FIG. 26 illustrates the steps implemented in order to set the Write Pointer (WP), at box 160 in FIG. 23. A similar process is used to set the RP at box 227 in FIG. 25. FIG. 26 should be read in conjunction with the following comments:

Box 240 (Is WRArray not full): WRArray is not full if Last<LastRE-1, where Last (global) is an index of the last WSL entry, and LastRE is an index of the last RSL Entry;

Box 242 (Is WRBArray not full): WRBArray is not full if LBL<LRBL-1, where LBL and LRBL are as previously defined with regard to FIG. 20;

Box 244 (Lists Release): Perform SAT Page Write operation, SAT Block Write and CB rewrite if necessary;

Box 246 (Fill NEB): Select next N (N=NEBSize) erased blocks from MAPs stored in the CB;

Box 248 (Write WMAP): Write WMAP with Link field set to ErBlock and corresponding bit in BitMap field set to 0.

Perform CB rewrite if necessary.

Figure 27:
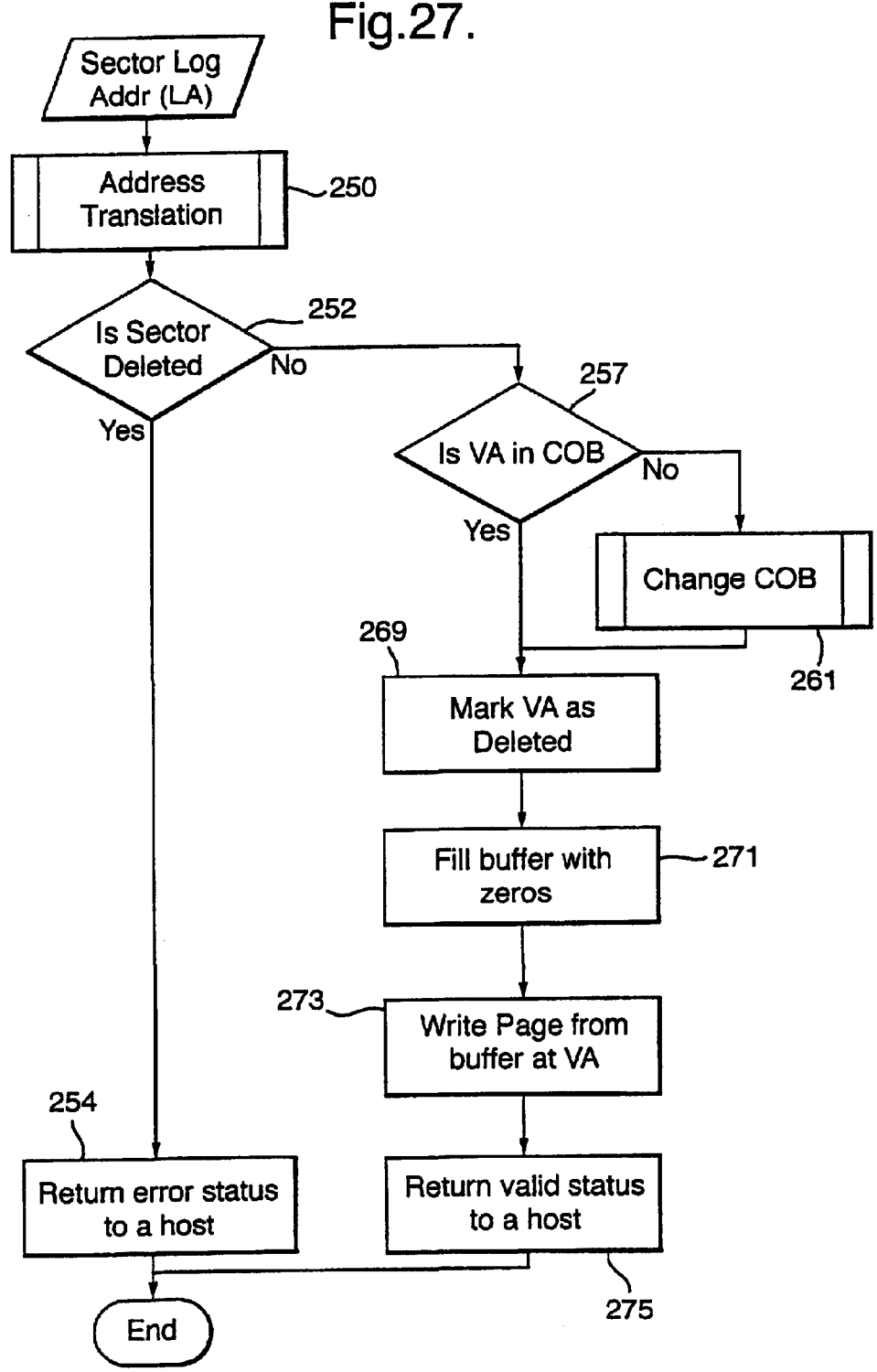
FIG. 27 is a flow diagram of a sector delete operation.

FIG. 27 is a flow diagram of the process steps carried out in a delete sector operation. This is in the initial steps similar to a write operation (see FIG. 23): the LA is translated 250 to a VA. If 252 the sector is deleted we return error status to the host 254. If the sector is not deleted we check 256 if the VA is in the COB and if it is not 261 in the COB we Change the COB 261 (same as FIG. 24). If VA is in the COB we Mark VA in the COB as deleted 269, then we fill one of the buffers of the Dual port SRAM 9 (in the controller) with zeros 271, and then write this "all zeros" page from the buffer to the sector to be deleted (thereby deleting the sector). We then return valid status 275 (confirming sector has been deleted) to the host.

Initialisation

Initialisation procedures and power-loss recovery procedures will now be described. For simplicity, these are described with reference to a single write pointer system (i.e. only WP) but it will be appreciated that the procedures will be readily extended as appropriate for the multiple write pointer system (WP, SWP, RP). All data and control structures are specially constructed to avoid generalised scanning during initialisation. Almost all control structures (except WSL and WBL) normally are derived from corresponding information stored in the CB. During initialisation of the card, it is necessary to perform following operations.

1. To read the last Control Block Pointers Table entry from the Boot Block and so identify the CB block(s) locations.
2. To reconstruct the TBLP by scanning the CB.
3. To scan header/ECC fields of pages sequentially following the write pointer position defined in the last TBL entry in the Control Block to identify sectors written since the last SAT rewrite and to construct the WSL and WBL.
4. To construct the NEB from corresponding MAP entries in the CB.
5. To construct the COB and ASBL.
6. To check if a block referenced in the ErB field of the last MAP is really erased If not, to complete erase operation.

Construction of WSL and WBL

During initialisation of the card, the last value of the Write Pointer (WP) to be stored is read from the latest TBL entry in the CB and a scan of page headers at successive pages from that location is performed to rebuild the WSL and WBL in processor SRAM. When an erased location is encountered, the end of the sequence of sectors written since the last SAT rewrite has been reached.

This sector scan must take account of the fact that the Write Pointer (WP) may jump from the end of a block to the beginning of a non-adjacent block. All block transitions made by the (WP) are recorded in the Link fields of MAP entries in the CB.

Construction of COB and ASBL

These structures can be reconstructed by copying corresponding entries from the CB. In addition, to construct the COB structure (to identify deleted sectors in it) it is necessary to scan a current block containing these sectors, whose address is defined in the Obs field of the last MAP entry in the CB. To identify obsolete sectors in this block, it is also necessary to scan WSL and WBL. In order to record ASBL pages we have to identify ASB addresses from the TBL and then to scan their header/ECC fields.

Power-Loss Recovery

It is a requirement for the memory system that it should be able to operate normally, and that no stored data should be lost, when power is restored, whatever the circumstances under which power has been removed. However, it is not necessary to restore the full normal state of the memory system immediately after power-on, only to allow it to operate normally. A normal state can be restored later as an exception, whenever any abnormal state is detected.

The normal state of the Memory System may be degraded if the supply voltage is removed whilst any of the following operations is being performed.
1. Writing of a data sector from a host
2. Writing of a data sector which is being relocated
3. Writing of an entry to a control data block (CB or BB)
4. Writing of a page to a control data block (SAT or CB)
5. Erasure of any block with obsolete sector or control data Power Loss During Writing of a Data Sector From a Host In this case, the data being written may be lost, but the host had not been informed that the write command had completed and may write the sector again. An incompletely written sector may exist in Flash memory as a result of the partial write operation. This is detected during initialisation when the value of the Write Pointer is established by reading the page headers in the block defined by the last Link parameter in the CB. The last detected sector should read fully to check its ECC, and the next page should be read to check that it is completely erased. If a partially written sector is detected, all other sectors should be relocated to a new Write Pointer position at the beginning of the next erased block, then the block should be erased.

Power Loss During Writing of a Data Sector Which is Being Relocated

This is detected during the process of establishing the Write Pointer during initialisation, as above. The same action of relocating sectors and erasing the block should be taken. In addition, an incomplete relocation operation should be detected by comparing logical sector addresses immediately preceding the Write Pointer with those of obsolete sectors in the block defined by the Obs parameter in the CB. Any pending sector relocations should be completed during initialisation.

Power Loss During Writing of an Entry to a Control Data Block (CB or BB)

This condition may be detected during normal initialisation when entries in the CB and BB are read and their ECCs are checked. The entry should be ignored if its ECC shows an error. The earlier operation which initiated the CB or BB entry write operation had not completed correctly and the entry will later be written correctly when this operation is repeated during normal operation.

Power Loss During Writing of a Page to a Control Data Block (ASB)

This condition may be detected during normal initialisation when pages in the ASB are read and their ECCs are checked. The page should be ignored if its ECC shows an error. The earlier operation which initiated the ASB page write operation has not completed correctly and the page will later be written correctly when this operation is repeated during normal operation.

Power Loss During Writing of a Full Control Data Block (SAT or CB)

This will result in an incomplete control data block existing in Flash memory, with no references to it by other data structures. This condition need not be detected during initialisation, and the block may be allowed to exist as a "lost block". The earlier operation which initiated the block write operation had not competed correctly and the block will later be written correctly when this operation is repeated during normal operation. At a later stage of normal operation, the lost block will be detected by a discrepancy with its MAP state, or by the discovery of a discrepancy in the number of erased blocks in the system (see Capacity Map in FIG. 16). Exception routines may then identify and erase the block, by full FLASH memory scanning if necessary.

Power Loss During Erasure of a Block With Obsolete Sector or Control Data

This will result in an incompletely erased block existing in Flash memory This condition is detected during initialisation when the state of the block referenced by the ErB field in the last MAP entry in the CB is checked. Re-erasure of this block can be performed, if necessary.

Further Alternative Embodiments

Various modifications to the above-described embodiments are possible without departing from the scope of the invention. For example, one alternative way of handling erasure operations is to always allow two COBs (and two COSBS) to exist: the advantage of this would be to make the best use of memory capacity. In the above-described embodiment, we only allow one COB, but also allow a POB to exist temporarily when there is a write pointer in a block which we wish to make the COB. This means that there must at all times be enough erased memory capacity to allocate for a POB, should it be necessary to have a POB. It therefore is attractive to make the best use of this memory capacity and one way of ensuring this is to always allow two COBs to exist, therefore eliminating the need for a POB (the second COB can act as a POB, when required). In such a two COB system, when it becomes necessary to create a new COB we erase the older one of the two COBs (unless it has a write pointer in it in which case we erase the younger one).

Figure 28:
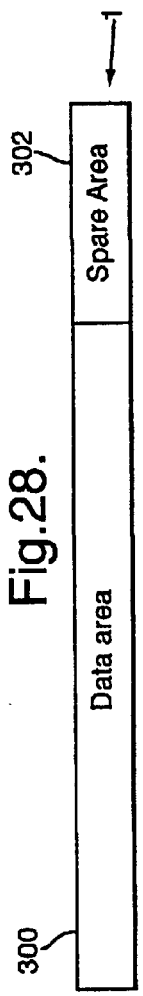
FIG. 28 illustrates the physical partitioning of a page in NAND or AND type FLASH memory.
Figure 29:
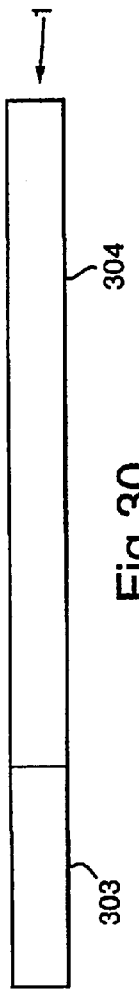
FIG. 29 is an illustration of an alternative way of arranging the data in the FLASH page of FIG. 28.

With reference to FIG. 3, and the description of the arrangement of data in each of the FLASH pages in the memory system, we also propose some alternative ways of storing the data within a page FIG. 28 shows the physical partitioning of a typical 528 Byte NAND or AND type FLASH memory page 1. The page comprises a 512 Byte "data area" 300 and a 16-Byte "Spare area" 302. In the embodiment described above with reference to FIG. 3, the controller 8 stores 512 Bytes of information 1a (e.g. one host data sector) in the Data Area 300, and stores the Header 1b and ECC 1c (together referred to as hereinafter as Overhead Data (OD)) in the Spare Area 302. However, other arrangements of data within the page 1 are possible. For example, as shown in FIG. 29, the Header 1b and ECC 1c could equally be stored in a first portion 303 of the Data Area 300, and the Information 1a stored in the portion 304 consisting of the Spare Area 302 and the remainder of the Data Area 300.

Figure 30:
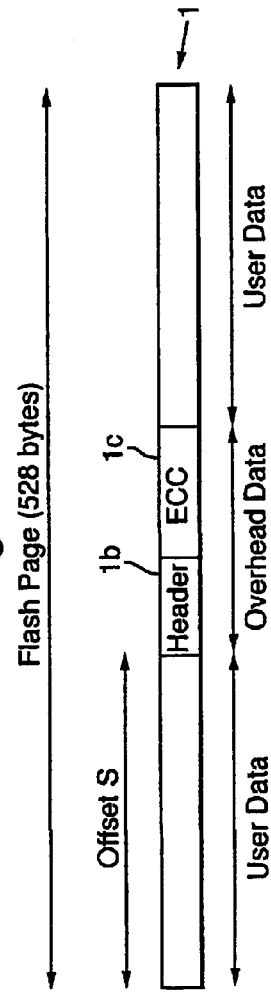
FIG. 30 is an illustration of a yet further way of arranging the data in the FLASH page of FIG. 28.
Figure 31A:
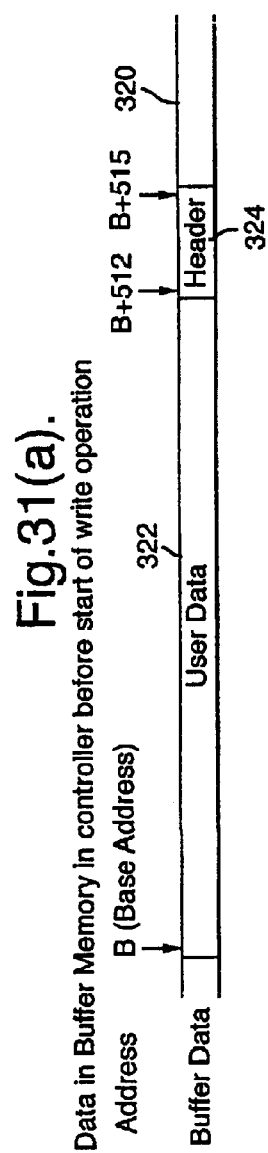
FIGS. 31(a) illustrates data in a buffer memory of the controller prior to a sector write operation.
Figure 31B:
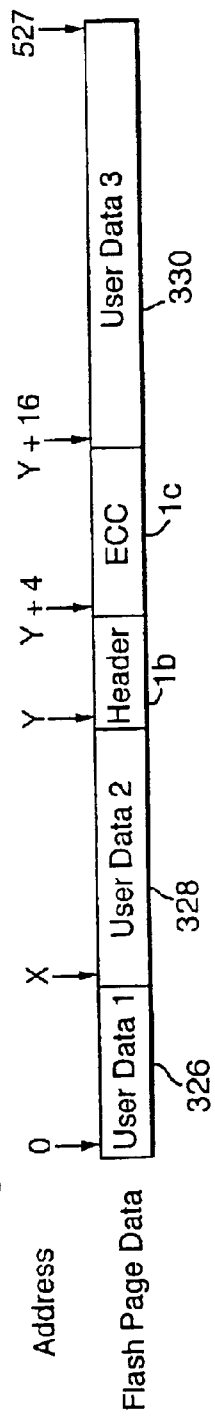
FIG. 31(b) illustrates data in a FLASH page after completion of a write operation, where the data is arranged according to the embodiment of FIG. 30.

Another possibility, shown in FIG. 30, is to write the Header 1b and ECC 1c at a position offset from the start of the FLASH page, and to write the Host Data Sector (which may be referred to as the "user data") in the remaining space either side of the Header and ECC. By how much (Offset S) the OD is offset may, for example, be determined by a function of either: (a) the physical address (PA) of the page 1; or (b) one or more bits within the first byte of user data (i.e. the host data sector) written to the page 1. FIG. 31(a) illustrates the arrangement of data in the controller buffer 320 before the start of a sector write operation, the data being arranged as a first portion 322 of user data and a second portion 324 of Header data. FIG. 31(b) shows the arrangement of the data in a FLASH memory page, following completion of the write operation in which the offset S is determined by one or more bits within the first byte of user data (option (b) above). The data is stored as a first portion 326 of the user data, followed by a second portion 328 of the user data, followed by the Header 1b and ECC 1c, followed by the third and final portion 330 of the user data. The length of portion 326+ portion 328 is dependent on data within portion 326. The length of portion 326 is defined to be less than or equal to the minimum offset, and the length of 328 is calculated on the basis of data within portion 326 to provide the correct Offset S. The first and second portions 326,328 of user data are separately identified so that the first portion 326 may be read from the FLASH memory by the controller in one operation, and evaluated by the controller in order to determine the length of the second portion 328 which should be read by the controller in a subsequent operation FIG. 32 is a table detailing the sequence of controller commands used to transfer the data from the controller buffer to the FLASH memory during the write operation.

One advantage of choosing the offset S to be a function of one or more bits of the user data is that the overhead data is therefore not inserted at the same position in the 528 Byte data segment in every sector. This protects the valuable overhead data from simultaneous loss on a large number of sectors in the event of a systematic failure in FLASH memory, such as a memory array column failure.

Figure 33:
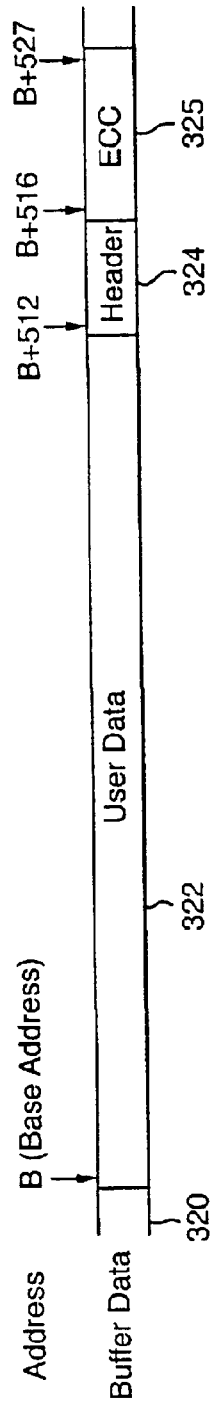
FIG. 33 illustrates data in a buffer memory of the controller after a read operation.

FIG. 33 shows the resulting arrangement of data in the controller buffer after completion of a read operation on the FLASH memory page of FIG. 31(b). From FIG. 33 it will be seen that the data in the buffer is arranged back to a first portion 322 of user data and a second portion 324 of Header data, now followed by a third and final portion 325 of ECC. FIG. 34 is a table detailing the sequence of controller commands used to transfer the data from the FLASH memory to the controller buffer during the read operation.

Additionally, with reference to interleaved write operations to multiple FLASH chips, as described already with reference to multiple FLASH chip memory systems, we also propose that this technique for writing substantially concurrently to a plurality of chips may also be used for writing data to a single memory chip in which the physical page size is a multiple of the size of a sector write by the controller e.g. each page of the memory is four times the size of a segment of (user+overhead) data written by the controller, where the controller writes data in uniformly sized segments.

Figure 35:
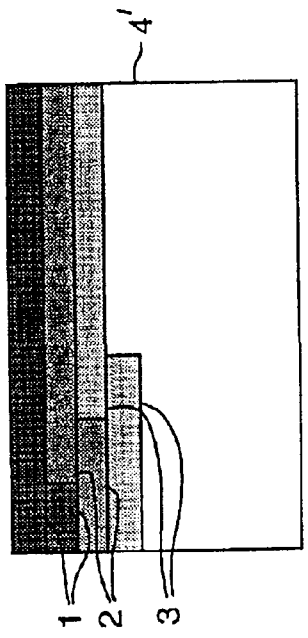
FIG. 35 is a schematic block diagram of an erasable block of sectors in NOR type FLASH memory, showing three sectors therein.

It will further be appreciated that the invention is applicable not only to NAND-type memories but also to other types of memory, such as AND and NOR type memories. In the case of AND type FLASH memory, each page 1 of a block has the same format as the NAND page format of FIG. 28 and we can use any of the possible arrangements of data within the pages as afore-described. We design the controller to still erase memory in blocks of sectors, although in blocks containing bad sectors the individual good sectors in the block to be erased will be erased individually. Thus, the controller does not treat any blocks containing bad sectors as bad blocks, but instead treats them as good (erasable) blocks and makes use of the good sectors within those blocks. In AND type embodiments though we ensure that the controller only uses blocks containing all good sectors for SAT blocks or ASBs.

Where AND type FLASH memory is being used and the memory system is a multiple FLASH chip system utilizing interleaved chip write operations as described above, where any block of sectors (pages) in one of the virtual blocks contains a bad sector, the controller causes the write pointers to skip this sector and go to the next good sector in the block e.g. where c=chip and s=sector, if a burst of four sector writes is c3s5, c4s5, c1s6, c2s6 then if c1s6 is a bad sector the sequence becomes c3sS, c4sS, c2s6, c3s6. This is in contrast to embodiments based on NAND type memory, where if one block in a virtual block contains one or more bad sectors the controller treats that block as a bad block and treats the whole virtual block as a bad virtual block.

Where we use NOR type FLASH memory our preferred embodiment is one in which we design the controller of the memory system to still read and write data structures to and from the FLASH memory in uniformly sized sectors, each sector being 528 Bytes wide. FIG. 35 illustrates schematically three such sectors 1,2,3 in a block 4' of NOR memory. Due to the fact that one row of memory in a NOR block is only 512 Bytes wide it will be appreciated that each of our sectors in NOR therefore fills one row and wraps round to fill a part of the next row. Nevertheless, it would be possible to define our sectors in NOR memory in a different manner, and we may choose to use sectors of smaller or larger size than 528 Bytes, and a block could even contain sectors of more than one size. The controller may arrange the data within each sector in any of the various different ways already described with reference to NAND and AND type memory pages, each sector including user and overhead data.

It will be appreciated from the foregoing that the physical sectors of the memory system, whether the memory system is based on NAND, AND or NOR type memory arrays, need not have any particular relationship to the physical architecture of the memory array itself, for example a sector need not correspond to a row (page) of the array, and no physical feature need be present to identify the boundary between one sector and a neighboring sector. A sector can be interpreted as a group of memory cells which are always treated by the controller as a unit. Different sectors need not be of the same size. Moreover, the physical structure of a sector has no dependence on data which might be stored in the sector. Also, embodiments are possible in which defective regions within a row (page) of memory cells are tolerated and are simply skipped over by the controller when writing to physical sectors.

With reference to the SAT, while as above-described the SAT is preferably stored in one or more blocks of the memory array 6, it would alternatively be possible to provide in the memory system 10 a separate non-volatile memory which is accessible to the controller, in which separate memory the controller stores the SAT.

Finally, in a modified version of the above-described embodiment, instead of always using available erased blocks in ascending order of their physical addresses as above-described, the controller uses the erased blocks in another order. In this modified embodiment, the NEB list contains a chosen subset of all the currently available erased blocks, the first block address in the NEB list is the next erased block to be used, and this first block address is removed from the NEB list when it has been allocated for data storage use. Any new erased block which is created (e.g. due to creation of obsolete data, following a delete command from the host) is added to the bottom of the NEB list. This continues for a period determined by the controller (which could be a predetermined number of sector write commands from the host, for example), at the end of which period the controller re-compiles the NEB list by replacing the entries in the NEB with a new subset of the currently available erased blocks. Conveniently, subsets of the whole set of all erased blocks may be used sequentially in order of ascending physical block addresses. This modified embodiment may have some advantage in reducing memory space requirements in connection with monitoring and storing the erased state of all blocks.

What is claimed is:

1. A memory system for connection to a host processor, the system comprising:
   a solid state memory having non-volatile memory sectors which are individually addressable and which are arranged in erasable blocks of sectors, each said sector having a physical address defining its physical position in the memory;

and a controller for writing data structures to and reading data structures from the memory, and for sorting the blocks of sectors into blocks which are treated as erased and blocks which are treated as not erased; wherein the controller includes:

means for translating logical addresses received from the host processor to physical addresses of said memory sectors in the memory;

a Write Pointer (WP) for pointing to the physical address of a sector to which data is to be written to from the host processor, said Write Pointer (WP) being controlled by the controller to move in a predetermined order through the physical addresses of the memory sectors of any block which is treated as erased and, when the block has been filled, to move another of the erased blocks;

wherein the controller is configured so that, when a sector write command is received from the host processor, the controller translates a logical address received from the host processor to a physical address to which data is written by allocating for said logical address that physical address to which said Write Pointer (WP) is currently pointing, and wherein the controller is configured to compile a Sector Allocation Table (SAT) of logical addresses with respective physical addresses which have been allocated therefore by the controller, and to update the SAT less frequently than memory sectors are written to with data from the host processor and further wherein the controller is configured so that, when a sector write command is received by the controller from the host processor which command renders obsolete data previously written to another sector, the controller stores in a temporary memory of the memory system the address of the sector containing the now obsolete data and further wherein the controller is configured so as to allow only a fixed predetermined number of blocks at any time, herein referred to as the Current Obsolete Blocks (COBs), to contain one or more sectors containing obsolete data which was written by the Write Pointer (WP), and so that when all the sectors in a said COB contain obsolete data, the COB is immediately erased.

2. A memory system according to claim 1, wherein the controller is configured so that where a sector in a block other than a said COB is to contain obsolete data, the controller: relocates any data in valid (not obsolete) sectors in a said COB to another block and then erases the said COB; marks said sector in the said block other than a COB as obsolete; and designates said other block as a new COB.

3. A memory system according to claim 1, where in said fixed predetermined number of COBs is one.

4. A memory system according to claim 2, wherein said block to which the controller relocates said valid data is the block in which the WP is currently located.

5. A memory system according to claim 2, wherein the memory system includes a further write pointer, herein referred to as the Relocation Pointer (RP), for pointing to the physical address of the sector to which said valid data is to be relocated, the RP always being in a different block of sectors to the Write Pointer (WP).

6. A memory system according to claim 5, wherein the memory system includes a further write pointer, referred to as the System Write Pointer (SWP), which points to the physical address of the sector to which system data is to be written from the host, the SWP always being in a different block to the Write Pointer (WP).

7. A memory system according to claim 6, wherein the controller is configured so as to allow at least two blocks which contain one or more obsolete sectors to exist at any time, one being said COB and the other being a Current Obsolete System Block (COSB) containing one or more obsolete system data sectors and, if any system data sectors need to be relocated in order to allow the COSB to be erased, the relocated system data is sent to the address to which the System Write Pointer (SWP) is currently pointing.

8. A memory system according to claim 6, wherein the memory system includes another write pointer, herein referred to as the System Relocation Pointer (SRP), for pointing to the physical address of the sector to which valid system data is to be relocated, the ERP always being in a different block of sectors to the Write Pointer (WP) and the System Write Pointer (SWP).

9. A memory system according to claim 6, wherein the controller is configured so that if the COB contains one of said write pointers (WP, RP, SWP, SRP) at the time when the controller needs to erase a said COB because obsolete data has just been created in another block, the controller proceeds with creating a new COB but postpones the erasure of the old COB, herein referred to as the Pending Obsolete Block (POB), until all erased sectors in the POB have been filled and said Pointer moves on to the next erased block to be used, as defined by the controller, at which time any valid (not obsolete) data in the POB is relocated by the controller and the POB is erased.

10. A memory system according to claim 7, wherein the controller is configured to store in a temporary memory of the memory system respective lists of logical sector addresses corresponding to sectors in the memory to which relocated data has been written to by the RP (herein referred to as the Relocation Sector List or RSL), the SWP (herein referred to as the Write System Sector List or WSSL), and the SRP (herein referred to as the System Relocation Sector List or SRSL) since the SAT was last updated, and the controller is configured to store in said temporary memory corresponding lists of the order of blocks which have been used by the RP, SWP and SRP (herein referred to as the Relocation Block List (RBL), the Write System Block List (WSBL) and the System Relocation Block List(SRBL)).

11. A memory system for connection to a host processor, the system comprising:

a solid state memory having non-volatile memory sectors which are individually addressable and which are arranged in erasable blocks of sectors, each said sector having a physical address defining its physical position in the memory;

and a controller for writing data structures to and reading data structures from the memory, and for sorting the blocks of sectors into blocks which are treated as erased and blocks which are treated as not erased; wherein the controller includes:

means for translating logical addresses received from the host processor to physical addresses of said memory sectors in the memory;

a Write Pointer (WP) for pointing to the physical address of a sector to which data is to be written to from the host processor, said Write Pointer (WP) being controlled by the controller to move in a predetermined order through the physical addresses of the memory sectors of any block which is treated as erased and, when the block has been filled, to move another of the erased blocks;

wherein the controller is configured so that, when a sector write command is received from the host processor, the controller translates a logical address received from the host processor to a physical address to which data is written by allocating for said logical address that physical address to which said Write Pointer (WP) is currently pointing, and wherein the controller is configured to compile a Sector Allocation Table (SAT) of logical addresses with respective physical addresses which have been allocated therefore by the controller, and to update the SAT less frequently than memory sectors are written to with data from the host processor and further wherein the solid state memory comprises a plurality of memory arrays in the form of a plurality of memory chips, and wherein the controller is configured to form the memory sectors in the plurality of memory chips into a multiplicity of virtual blocks, each said virtual block comprising one erasable block of memory sectors from each said memory chip, and to sort said virtual blocks into ones which are treated as erased and ones which are treated as not erased and further wherein the controller is configured to compile a list of the virtual blocks treated as erased and store this in temporary memory in the memory system, and to control the Write Pointer (WP) to move from one chip to another for each consecutive sector write operation, starting at one sector in one erasable block of the virtual block and moving consecutively to one sector in each of the other erasable blocks in the virtual block until one sector has been written in each erasable block of the virtual block, and then moving back to the chip in which the first sector was written and proceeding in a similar manner to fill another one sector in each erasable block of the virtual block, and so on until the virtual block is full of data, and then to move the Write Pointer (WP) on to the next virtual block in said list of virtual blocks being treated as erased, and fill this next virtual block in a similar manner.

12. A memory system according to claim 11, wherein the controller is configured so that for every n contiguous sector write operations the controller executes for a multiple sector write command received from the host processor, where n is less than or equal to the number of solid state memory chips in the memory system, the controller writes substantially concurrently to one sector in each of n of the chips.

13. A memory system according to claim 11, wherein the controller is configured to carry out erasure of any said virtual block by concurrently erasing all the erasable blocks in the virtual block.

* * * * *